(12) United States Patent
Eray

(10) Patent No.: US 8,157,179 B2
(45) Date of Patent: Apr. 17, 2012

(54) DOCUMENT HAVING AN INTEGRATED CONTACTLESS RESONATOR ELECTRONIC DEVICE

(75) Inventor: Yves Eray, Ouistreham (FR)

(73) Assignee: Oberthur Technologies, Levallois-Perret (FR)

( * ) Notice: Subject to any disclaimer, the term of this patent is extended or adjusted under 35 U.S.C. 154(b) by 1017 days.

(21) Appl. No.: 11/994,886

(22) PCT Filed: Jul. 6, 2006

(86) PCT No.: PCT/FR2006/001620
§ 371 (c)(1),
(2), (4) Date: Mar. 5, 2008

(87) PCT Pub. No.: WO2007/006927
PCT Pub. Date: Jan. 18, 2007

(65) Prior Publication Data
US 2008/0314989 A1    Dec. 25, 2008

(30) Foreign Application Priority Data
Jul. 7, 2005  (FR) ........................................ 05 07252

(51) Int. Cl.
*G06K 19/06* (2006.01)
(52) U.S. Cl. ........................................ 235/492; 235/380
(58) Field of Classification Search ................... 343/742
See application file for complete search history.

(56) References Cited

U.S. PATENT DOCUMENTS

| 6,121,544 A | 9/2000 | Petsinger |
| 6,774,865 B1 | 8/2004 | Serra |
| 7,482,925 B2 * | 1/2009 | Hammad et al. ........... 340/572.1 |
| 7,701,408 B2 * | 4/2010 | Bombay et al. ............... 343/841 |
| 7,847,698 B2 | 12/2010 | Rancien et al. |
| 2003/0019941 A1 | 1/2003 | Altwasser et al. |
| 2004/0104274 A1 | 6/2004 | Kotik et al. |
| 2005/0179604 A1 * | 8/2005 | Liu et al. ........................ 343/742 |

(Continued)

FOREIGN PATENT DOCUMENTS

DE  19721057  1/2007

(Continued)

OTHER PUBLICATIONS

International Search Report of PCT/FR2006/001620 filed Jul. 6, 2006, date of mailing Nov. 23, 2006.

*Primary Examiner* — Thien M. Le
*Assistant Examiner* — Sonji Johnson
(74) *Attorney, Agent, or Firm* — Young & Thompson

(57) ABSTRACT

A support (10) provided with at least first (12) and second (14) parts capable of displacing relative to one another along a selected axis of displacement (16), and a contactless electronic device (1) mounted in the first part (12) of the support and including an electronic microcircuit (3) and an antenna (2) electrically connected to the electronic microcircuit (3), and capable of being (electro)magnetically coupled with an external reading station (5), the electronic microcircuit (3) being capable of exchanging information with the outside. The second part (14) is provided with electromagnetic coupling attenuating elements, having a resonator circuit (7) coupled to the antenna (2), and situated in line with the antenna (2) when the first and second parts are essentially superimposed one above the other, and are capable of rendering the exchange of information with the outside inoperative or operative according to the distance between the first and second parts.

30 Claims, 20 Drawing Sheets

U.S. PATENT DOCUMENTS

| | | |
|---|---|---|
| 2005/0274794 A1* | 12/2005 | Bason et al. .................. 235/380 |
| 2006/0050008 A1 | 3/2006 | Morand et al. |
| 2007/0265690 A1* | 11/2007 | Lichtenstein et al. ........ 607/116 |
| 2007/0271467 A1 | 11/2007 | Ayala et al. |

FOREIGN PATENT DOCUMENTS

| | | |
|---|---|---|
| EP | 0149240 | 7/1985 |
| EP | 886239 | 12/1998 |
| FR | 2724263 | 3/1996 |
| FR | 2769390 | 4/1999 |
| FR | 2812482 | 2/2002 |
| FR | 2815176 | 4/2002 |
| FR | 2 863 748 A1 | 6/2005 |
| GB | 2293050 | 3/1996 |
| JP | 2003-300579 A | 10/2003 |
| WO | 98/08190 | 2/1998 |
| WO | 02089052 | 11/2002 |
| WO | 2005/045754 A1 | 5/2005 |
| WO | 2006/005984 A1 | 1/2006 |

* cited by examiner

| | 0,5 × ISO | | 1 × ISO | | 2 × ISO | |
|---|---|---|---|---|---|---|
| | Freq (MHz) | Coupling (dB) | Freq (MHz) | Coupling (dB) | Freq (MHz) | Coupling (dB) |
| Reference | 13,61 | -4,80 | 13,58 | -7,04 | 13,57 | -12,96 |
| Resonator N°1 (Fig. 10-18) | 13,61 | -28,55 | 13,58 | -41,99 | 13,57 | -54,32 |
| | 14,39 | -48,10 | 13,73 | -47,9 | 13,56 | -54,3 |
| Resonator N°2 (Fig. 19-26) | | | 13,58 | -35,97 | | |
| | | | 13,76 | -39,99 | | |
| Resonator N°3 (Fig. 27-32) | | | 13,58 | -44,63 | | |
| | | | 13,64 | -49,76 | | |

Fig. 33

|  | 0,5 x ISO = 17,75mm between Reader and Passport | | 1 x ISO = 35,5mm between Reader and Passport | | 2 x ISO = 71mm between Reader and Passport | |
| --- | --- | --- | --- | --- | --- | --- |
|  | Resonator | Attenuation | Resonator | Attenuation | Resonator | Attenuation |
| Large Resonator (Fig. 10-18) | => 13,61 MHz +780 KHz | -23,75 dB (% 237) -43,3 dB (% 21379) | => 13,58 MHz +150 KHz | -34,95 dB (% 3126) -42,86 dB (% 19319) | => 13,57 MHz +10 KHz | -13,24 dB (% 13677) -13,19 dB (% 13614) |
| Small Resonator (Fig. 19-26) |  |  | => 13,58 MHz +180 KHz | -28,93 dB (% 19319) -32,95 dB (% 1972) |  |  |
| Resonator N°3 (Fig. 27-32) |  |  | => 13,58 MHz +60 KHz | -37,59 dB -42,72 dB (% 18706) |  |  |

Fig. 34

DOCUMENT HAVING AN INTEGRATED CONTACTLESS RESONATOR ELECTRONIC DEVICE

The present invention concerns making secure the operation of a document having an electronic device adapted to the contactless communication technology, as described in the ISO 14443 standard.

It also concerns an electronic entity including a contactless electronic device integrated into a support, such as a passport, driver's permit or, more generally, an identity document that a bearer might be required to show during identity checks.

It also concerns a document consisting of two parts each formed by a card conforming to the ISO 7816 standard and flexibly connected to each other by one of their sides.

It also finds an application in the contactless communication technology as much as in the dual or hybrid technology, in which the electronic device also has a contact communication interface.

It has already been proposed to integrate into a security document, in practice carrying printed data intended to enable an identity check, a contactless electronic device, for example a microprocessor-based integrated circuit, intended to communicate with the external environment by means of an antenna, to enable contactless exchange of information between the document and an external control station. The exchange of data is typically effected at the initiative of the reader (the reader sends commands to which the contact electronic device responds).

This kind of security document enables exchange of data richer in information than printed characters or even a photograph, such as biometric data, and, where appropriate, verification of the compatibility between the printed data and the stored data, to detect any attempt to corrupt the printed data.

However, this principle of contactless reading of the data contained in the integrated circuit runs into the understandable reservation that this data can be read unknown to the bearer, by systems that may be unauthorized.

Solutions for preventing such unauthorized reading are already known. For example, the document WO-2005/045754 identifies two reference positions of a document, for example the "open" and "closed" positions, and provides for reading of the data to be possible only in one or the other of those positions. To this end the integrated circuit is connected to at least one coupling element with the external environment and that coupling element is able to exchange information with the external environment or not, depending on the configuration of the security document. In the aforementioned document, the coupling element is an antenna produced on two sheets: the coupling element is operative or inoperative depending on the geometry of the antenna and the instantaneous configuration of the document. In a first embodiment, if the antenna has turns each of which is produced in part on each of said sheets, said antenna enables exchange when the document is open (the turns have a maximum exchange area), whereas if the document is closed the halves of each turn are superposed so that they conjointly define a null section, ruling out any exchange with the external environment. A converse situation is obtained if the antenna is made in the shape of an 8, with a crossover of the antenna tracks in line with the fold line between the sheets: in this configuration there can be exchanges only when the document is closed.

However, this kind of security document requires a flexible electrical connection between the two sheets, which is costly and causes reliability problems.

The present invention provides a solution to this problem.

It relates to a document including a support having at least first and second portions adapted to be moved relative to each other and a contactless electronic device mounted in the first portion of the support and including an electronic microcircuit and an antenna electrically connected to said electronic microcircuit and adapted to be (electro)magnetically coupled to an external reading station, the electronic microcircuit being adapted to exchange information with the external environment.

According to a general definition of the invention, the second portion includes means for attenuating the (electro) magnetic coupling, including a resonator circuit coupled to said antenna and disposed substantially in line with the antenna when the first portion and the second portion are substantially superposed one on the other, and adapted to render inoperative or operative the exchange of information with the external environment as a function of the offset between the first and second portions.

This kind of document also has the advantage that it renders the microcircuit inoperative when it is in a position corresponding to an angular offset between the two portions of the document of the order of 0 to 60°, for example 0 to 45°.

In one embodiment, the first and second portions of the support are independent and not connected to each other.

In another embodiment, the document can be folded and the first and second portions are adapted to pivot relative to each other about a folding line along the edges of these portions.

In practice, the resonant frequency of the resonator circuit is out of the range of operating frequencies of the electronic microcircuit. For example, the electronic microcircuit operates at a frequency below 100 MHz, for instance between 13 and 15 MHz, typically equal to approximately 13.56 MHz, and has a bandwidth of the order of 1 MHz.

The resonant frequency of the resonator circuit is between 6 and 10 MHz, for example between 7.5 MHz and 8.5 MHz, if the microcircuit operates at a frequency of the order of 13 to 15 MHz.

In another embodiment virtually all of the antenna extends over about half of the area of the first portion situated in the vicinity of the fold line.

For example, the antenna extends over almost all of the edge of the first portion along the fold line.

In one embodiment the resonator circuit extends over substantially more than half the area of the second part situated in the vicinity of the fold line.

For example, the resonator circuit extends over almost all the edge of the second portion along the fold line.

In a further embodiment, the resonator circuit comprises a conductive winding with free ends.

For example, the resonator circuit comprises a plurality of turns separated two by two by a distance less than 0.5 mm.

The antenna comprises a conductive winding connected to the electronic microcircuit.

The antenna is of rectangular shape, for example, with the longer side running along the fold line.

In a further embodiment, the geometrical centre of the antenna is placed in the first quarter of the first portion situated relatively close to the fold line.

The right-hand edge of the antenna is situated at a distance from the fold line between 2 and 15 mm, approximately equal to 5 mm, for example.

As a general rule, the document belongs to the group formed by security documents, identity documents, passports, driver's permits.

The present invention also consists in an electronic entity including a support having at least first and second portions adapted to be moved relative to each other with respect to a chosen displacement axis and a contactless electronic device mounted in the first portion of the support and including an electronic microcircuit and an antenna electrically connected to that electronic microcircuit and adapted to be (electro) magnetically coupled to an external reading station, this electronic microcircuit being adapted to exchange information with the external environment, According to another aspect of the invention, the second portion has means for attenuating the electromagnetic coupling comprising a resonator circuit coupled to said antenna and disposed substantially in line with the antenna when the first and second portions are substantially superposed one on the other, and adapted to render the exchange of information with the external environment inoperative or operative as a function of the offset between the first and second portions.

The present invention consists finally in a method of controlling exchange of information between a document and an external reading station, said document including a support having at least first and second portions adapted to be moved relative to each other with respect to a chosen displacement axis and a contactless electronic device mounted in the first portion of the support and including an electronic microcircuit and an antenna electrically connected to that electronic microcircuit and adapted to be (electro)magnetically coupled to an external reading station, this electronic microcircuit being adapted to exchange information with the external environment.

According to a further aspect of the invention the second portion includes means for attenuating the electromagnetic coupling comprising a resonator circuit coupled to said antenna and disposed substantially in line with the antenna when the first and second portions are substantially superposed one on the other and the attenuation means render the exchange of information with the external environment inoperative as a function of the offset between the first and second portions.

Other features and advantages of the invention will become apparent in the light of the following detailed description and the drawings, in which.

Figure 35:
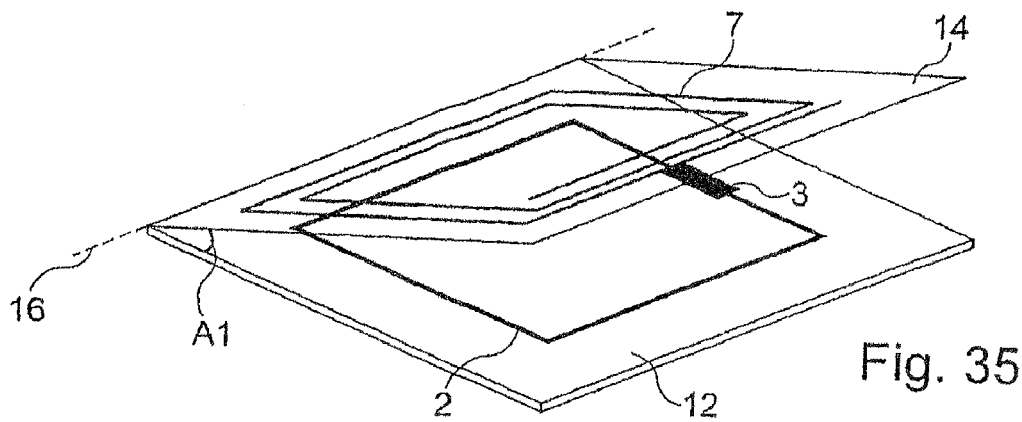
Figure 36:
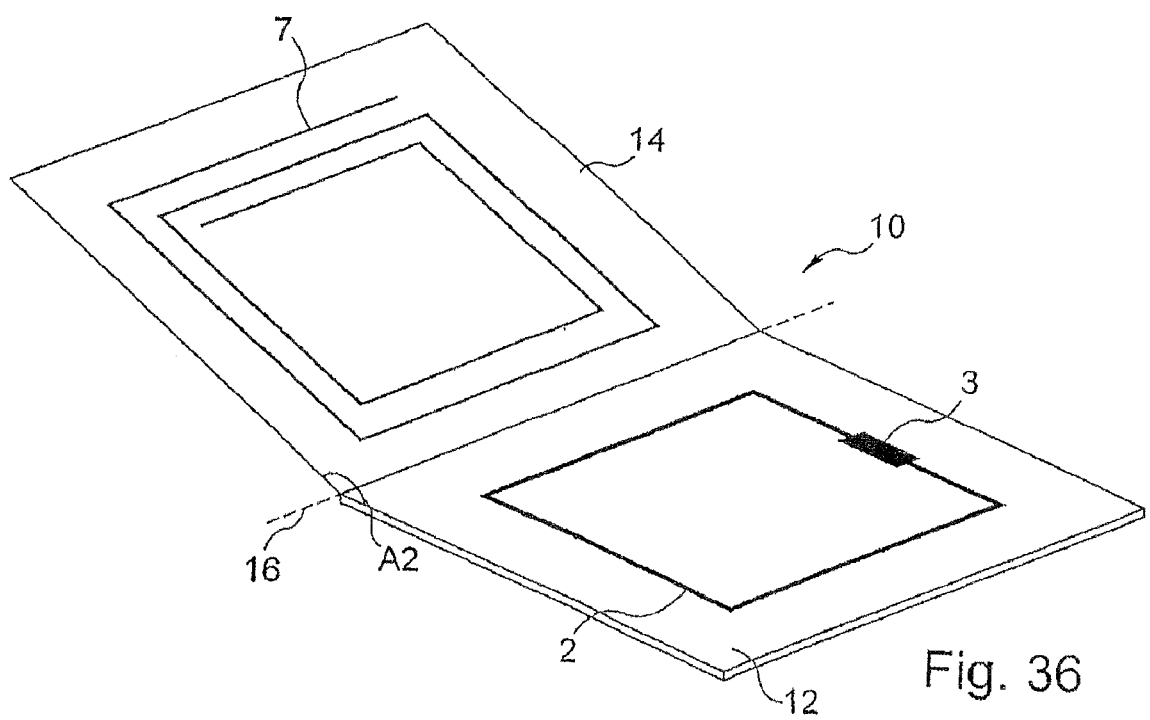

FIGS. 22 to 26 relating to the second embodiment of the resonator according to the invention are similar to the FIGS. 13 to 17 relating to the first embodiment of the resonator;

FIGS. 27 to 32 relating to the third embodiment of the resonator according to the invention are similar to FIGS. 13 to 18 relating to the first embodiment of the resonator;

FIGS. 33 and 34 are tables showing results at 0.5 ISO, 1 ISO and 2 ISO; and FIGS. 35 and 36 are diagrams representing a document with a low angular offset and a high angular offset, respectively.

Figure 2:
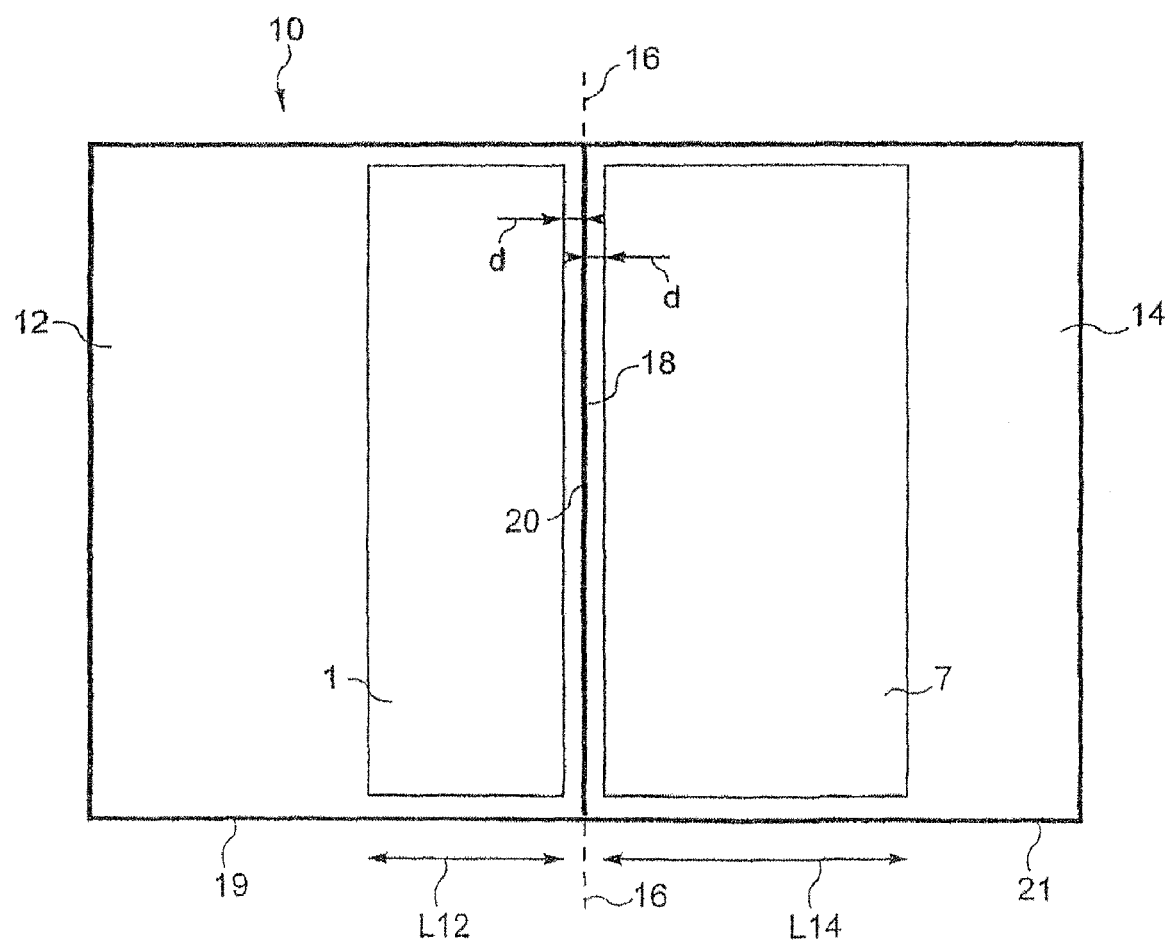
FIG. 2 is a diagram representing a folding document in accordance with the invention in an open position.
Figure 37:
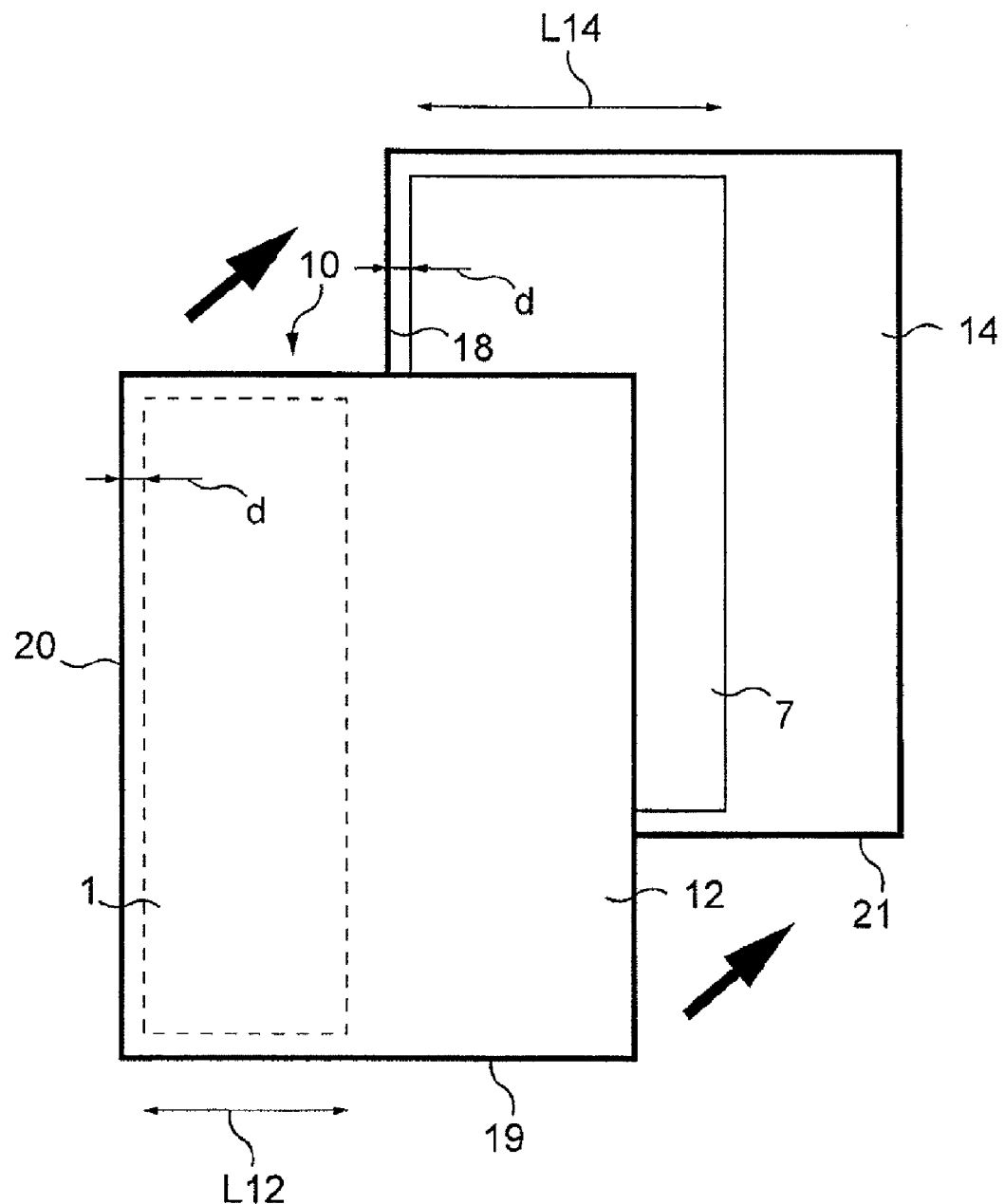

FIG. 37 is an alternative view of FIG. 2 where the first portion and second portion are independent.

The following description refers to a security document forming a passport consisting of sheets fastened together along a fold line. Obviously this description based on a passport is in no way limiting on the invention, and can apply to other security documents, such as a driver's permit, an identity card, a transport ticket, a subscription ticket, an access control document, a ticket consisting of two parts each formed of a card conforming to the ISO 7816 standard and flexibly connected together by one of their sides.

The security document is not necessarily foldable. It can in fact comprise two portions that move relative to each other with respect to a chosen translation axis.

Figure 1:
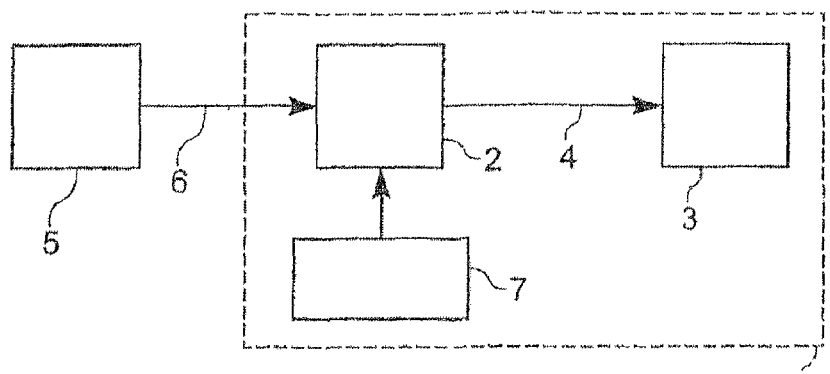
FIG. 1 is a diagram representing the system for processing the signal in the document according to the invention.

Referring to FIG. 1, the foldable document consists of a contactless electronic device 1 consisting of an antenna 2 and a microcircuit 3 electrically connected to said antenna 2. The antenna 2 is (electro)magnetically coupled to an external station 5.

According to the invention, a resonator circuit 7 is (electro) magnetically coupled to the antenna 2 to attenuate the signal 6 emitted by the reader 5 and received by the antenna 2 so that the signal 4 coming from the antenna 2 and going to the microcircuit 3 is attenuated to render the exchange of data between the microcircuit 3 and the reader 5 inoperative when the document is in a chosen configuration.

As a general rule, the security document includes a support 10 having at least first and second portions 12 and 14 adapted to move with respect to each other. The movement can be effected with respect to a chosen displacement axis or not. The portions 12 and 14 are cards conforming to the ISO 7816 standard, for example.

Referring to FIG. 2, the document can be folded and the portions 12 and 14 pivot relative to each other about a fold line 16 running along the edges 18 and 20 of the portions 12 and 14, respectively.

The portions 12 and 14 can occupy a plurality of positions between a "closed" position in which said portions 12 and 14 are superposed and the angle between them is 0° and an "open" position in which the angle between the portions is greater than or equal to 90°.

Referring to FIG. 35, the angular offset A1 is of the order of 30°, corresponding to the document 10 being slightly open.

Referring to FIG. 36, the angular offset A2 is of the order of 140°, corresponding to the document 10 being wide open.

The portions 12 and 14 can form the cover of the document including a plurality of sheets disposed between the two inside faces of the cover. Alternatively, they can constitute any sheets of said document.

The dimensions of the passport are 125×90 mm, for example. When closed, the thickness of the passport is of the order of 2 mm.

In practice, the contactless electronic device 1 is mounted within the thickness of the first portion 12 of the support 10. The contactless electronic device 1 includes an electronic microcircuit 3 and an antenna 2 electrically connected to said electronic microcircuit 3.

The antenna 2 is (electro)magnetically coupled to an external reading station 5. The microcircuit 3 is adapted to exchange information with the external environment.

As indicated with reference to FIG. 1, the countermeasure avoiding fraudulent reading of the document (known as "anti-skimming") and the station consists here in attenuating the signal 4 between the antenna 2 and the microcircuit 3. As seen in more detail hereinafter, this attenuation applies essentially to the power aspect of the signal 4, to render the microcircuit inoperative when the portions 12 and 14 of the document have an angular offset of a few degrees (for example 0 to 60°).

In practice the inside face of the portion 14 of the support is equipped with means for attenuating the (electro)magnetic coupling. Those attenuation means comprise a resonator circuit 7 coupled to the antenna 2 and disposed substantially in line with the antenna when the first and second portions 12 and 14 are substantially superposed one on the other. These attenuation means render the exchange of information with the external environment inoperative as a function of the angular offset between the portions 12 and 14 of the document 10.

Here the resonator has an attenuating effect on the combination formed by the microcircuit 3 and the antenna 2. In fact the frequency behavior of the antenna 2 (with the microcircuit 3) and the resonator 7 differ and involve completely different phenomena. Moreover, the resonant frequency of the resonator is outside the range of operating frequencies of the microcircuit.

For example, the electronic microcircuit 3 operates at a frequency below 100 MHz, in particular between 13 and 15 MHz, and preferably 13.56 MHz with a range having a width of the order of 1 MHz.

For its part, the resonant frequency of the resonator circuit 7 is between 6 and 10 MHz and preferably between 7.5 and 8.5 MHz.

The objective of including the resonator 7 is to have the best influence on the coupling of the antenna 2 in order to obtain a clean break in the initial coupling at the operating frequency of the microcircuit 3 (which is typically 13.56 MHz).

The disposition of the antenna 2 relative to the resonator 7 is preferably chosen so that the distance between them is as small as possible when the document opens.

In the situation corresponding to portions 12 and 14 consisting of two cards with a format conforming to the ISO 7816 standard, the bearer will be protected from fraudulent reading by maintaining the two cards superposed one on the other.

Referring to FIG. 2, it is seen that the antenna 2 occupies virtually all of the edge 18 situated in the vicinity of the fold line 16. On the other hand, this antenna 2 has a limited width L12 along the edge 19 although maintaining sufficient coupling. For example, the resonator 7 is chosen so that it occupies the greatest possible area (width L14 along the edge 21 of the portion 14 greater than the width L12 along the edge 19 of the portion 12), for example all of the available area of the sheet 14 of the passport 10.

Figure 10:
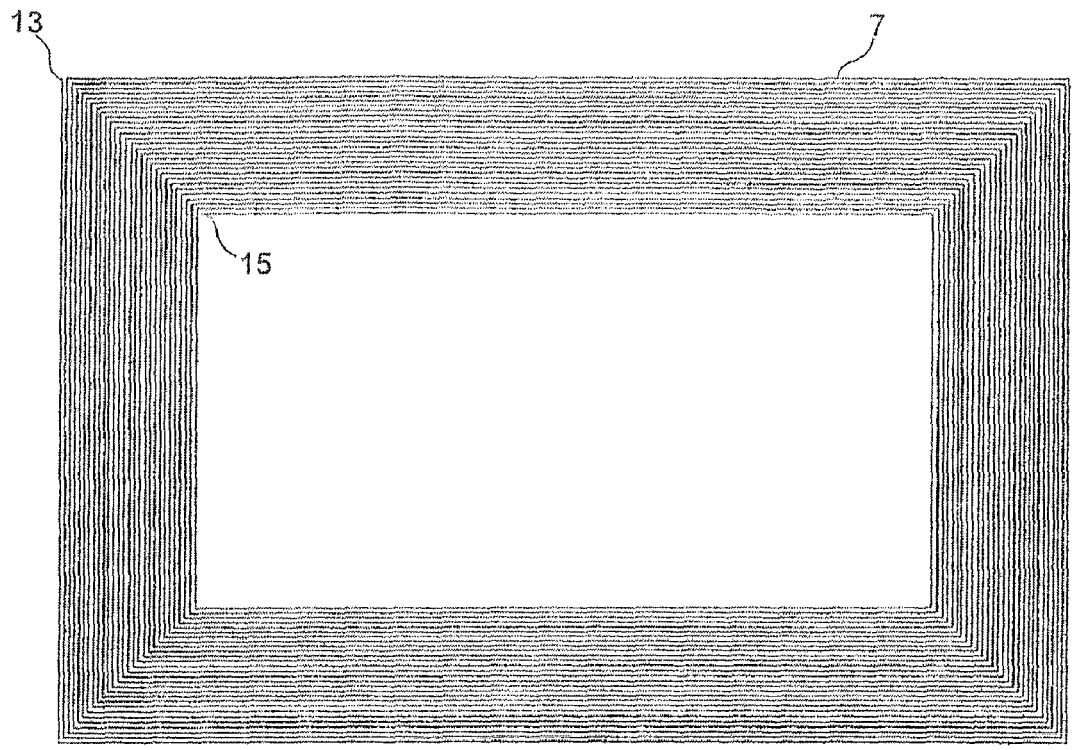
FIG. 10 is a diagram representing a first embodiment of a resonator circuit according to the invention.

For example, the resonator 7 consists of a set of turns for obtaining the required resonant frequency (FIG. 10).

Figure 19:
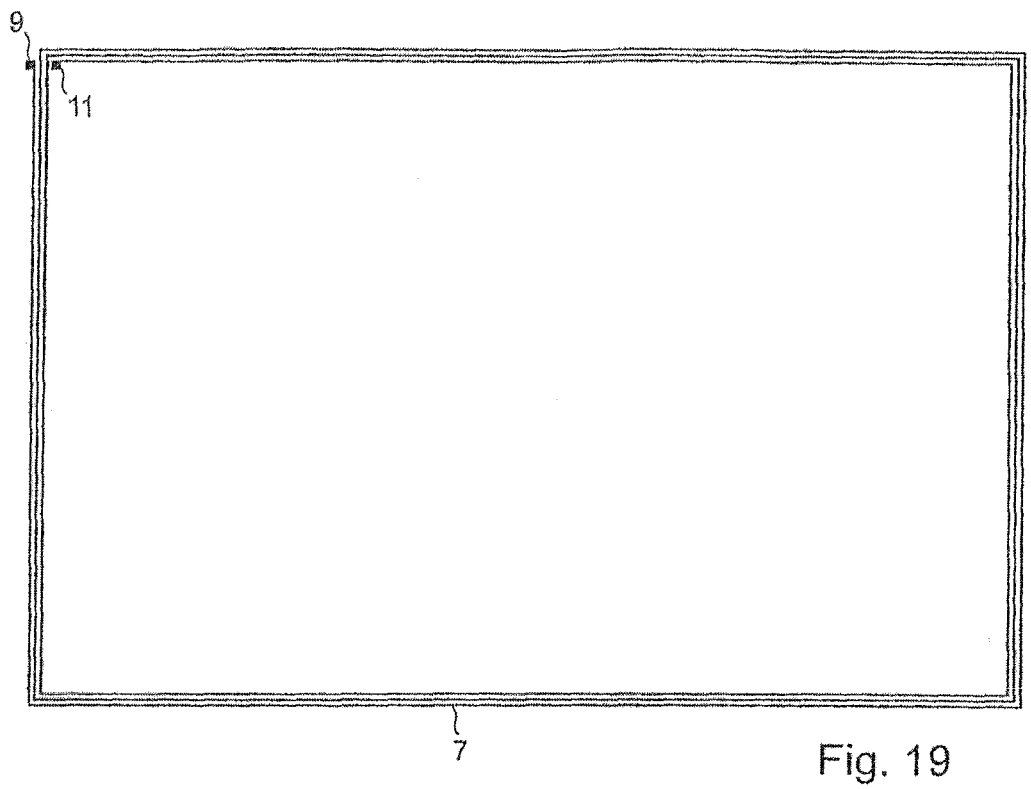
FIG. 19 is a diagram representing a second embodiment of the resonator according to the invention.

A first variant of the resonator is formed of a few turns connected by a capacitor whose value enables the required frequency to be achieved (FIG. 19).

Other variants of the resonator comprise a loop and a discrete capacitor.

Here the frequency of the resonator is specific. The resonator does not seek to attenuate in series the signal emitted by the reader but imposes its operation on the antenna 2 and more particularly very poor coupling (yield) at the operating frequency of the microcircuit 3.

With a view to obtaining an influence between the resonator element 7 and the antenna 2, the elements 7 and 2 are disposed as close as possible to the fold line 16. This kind of arrangement achieves a small distance between the elements 7 and 2 when the passport is opened, i.e. when the portions 12 and 14 of the passport are pivoted by an angle of a few degrees. Communication with the microcircuit is therefore rendered inoperative in the case of an angular offset of a few degrees.

For example, the right-hand edge of the antenna 2 is situated at a distance d from the fold line 16 between 2 and 15 mm, typically 5 mm, in particular to improve the reliability of the mounting of the various electronic elements of the device according to the invention.

The antenna 2 and the resonator 7 can be produced in copper (produced by etching a copper layer previously disposed on the support) or by screenprinting a conductive ink.

The resonator 7 and the antenna 2 are preferably produced during the same fabrication (screenprinting, etching) step.

In the case of a passport, the antenna 2 and the resonator 4 are in practice produced on an intermediate layer of the cover, that intermediate layer being laminated with other layers to form the cover and to receive the device according to the invention.

Referring to FIG. 37, an embodiment of FIG. 2 is shown where the first the first portion (12) and the second portion (14) of the support (10) are independent and not connected to each other.

Figure 3:
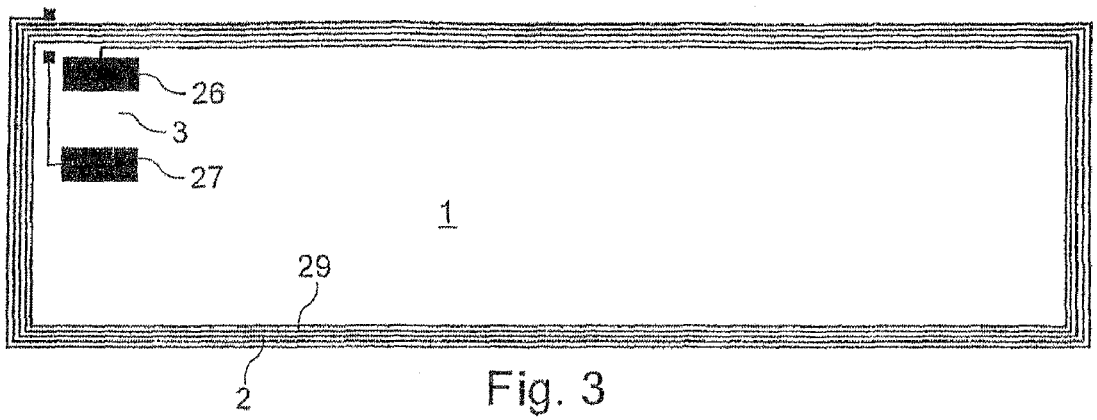
FIG. 3 is a diagram representing a prior art contactless electronic device.

Referring to FIG. 3, the contactless electronic device 1 comprises a microcircuit (not shown) connected to the terminals 26 and 27 of the antenna 2 formed of a conductive winding with a plurality of turns 29.

Figure 4:
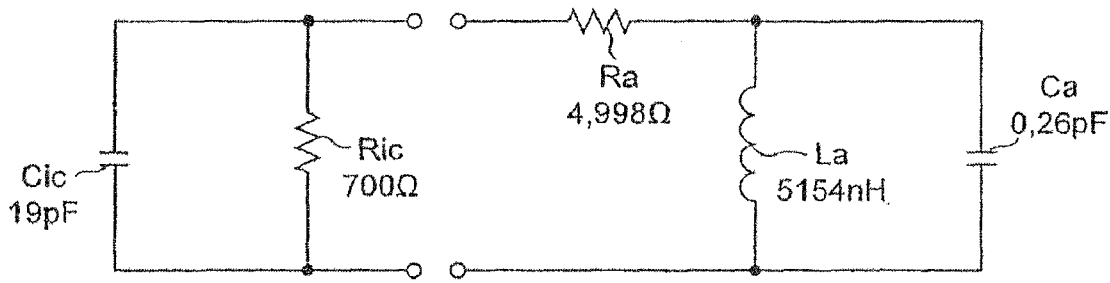
FIG. 4 is an equivalent circuit diagram of the contactless electronic device from FIG. 3.

Referring to FIG. 4, the electronic microcircuit 3 is represented in the conventional way by a resistor Ric and a capacitor Cic in parallel. The resistance of the resistor Ric is 700Ω, for example, and the capacitance of the capacitor Cic is 19 pF. The antenna 2 is represented by the series association of an inductor $L_a$ (inductance 5154 nH for example) and a resistor $R_a$ (resistance 4.998Ω, for example). When the antenna 2 is formed of a plurality of turns, the antenna is also modeled with an interturn capacitor $C_a$ (capacitance 0.26 pF for example) connected in parallel with the inductor $L_a$.

Figure 5:
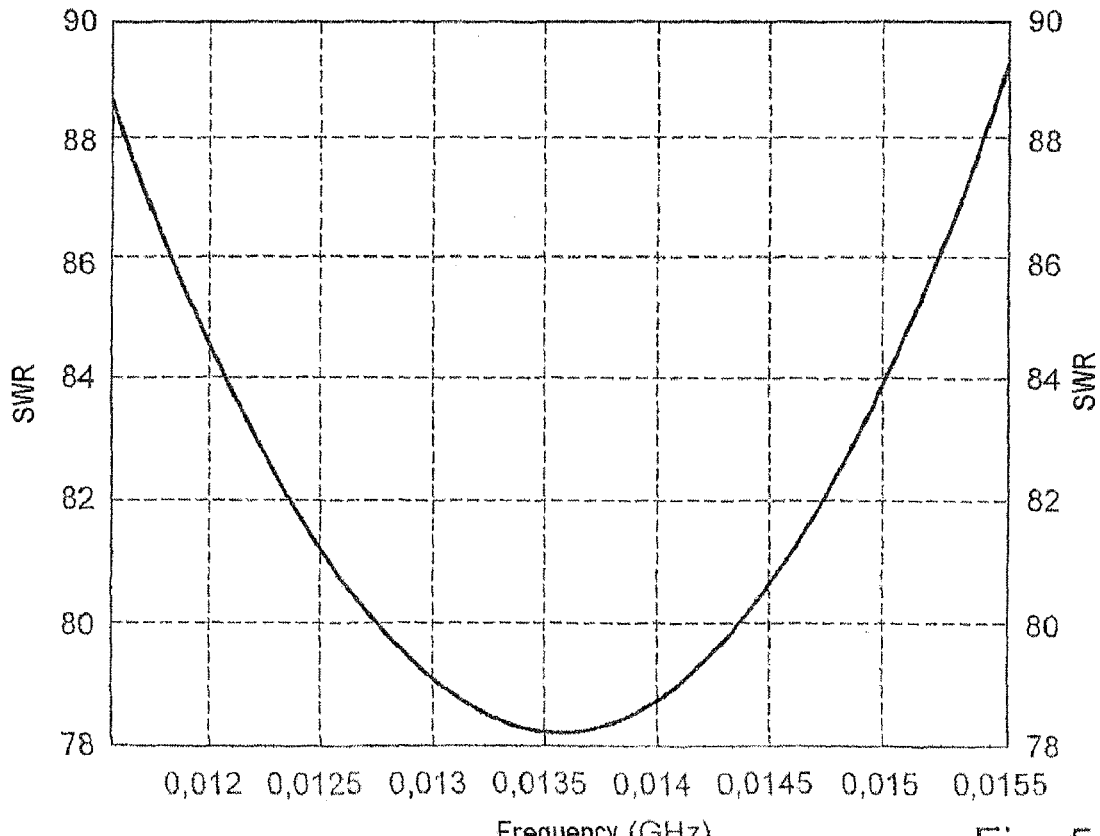
FIG. 5 is a curve illustrating the SWR of the contactless electronic device from FIG. 3 at the terminals of the loads Ric and Cic of the microcircuit of said prior art contactless electronic device.

Referring to FIG. 5, the standing wave ratio (SWR) is represented as a function of frequency. This SWR qualifies the match between the antenna 2 and the microcircuit 3. The match is ideal if the SWR is equal to 1.

Figure 6:
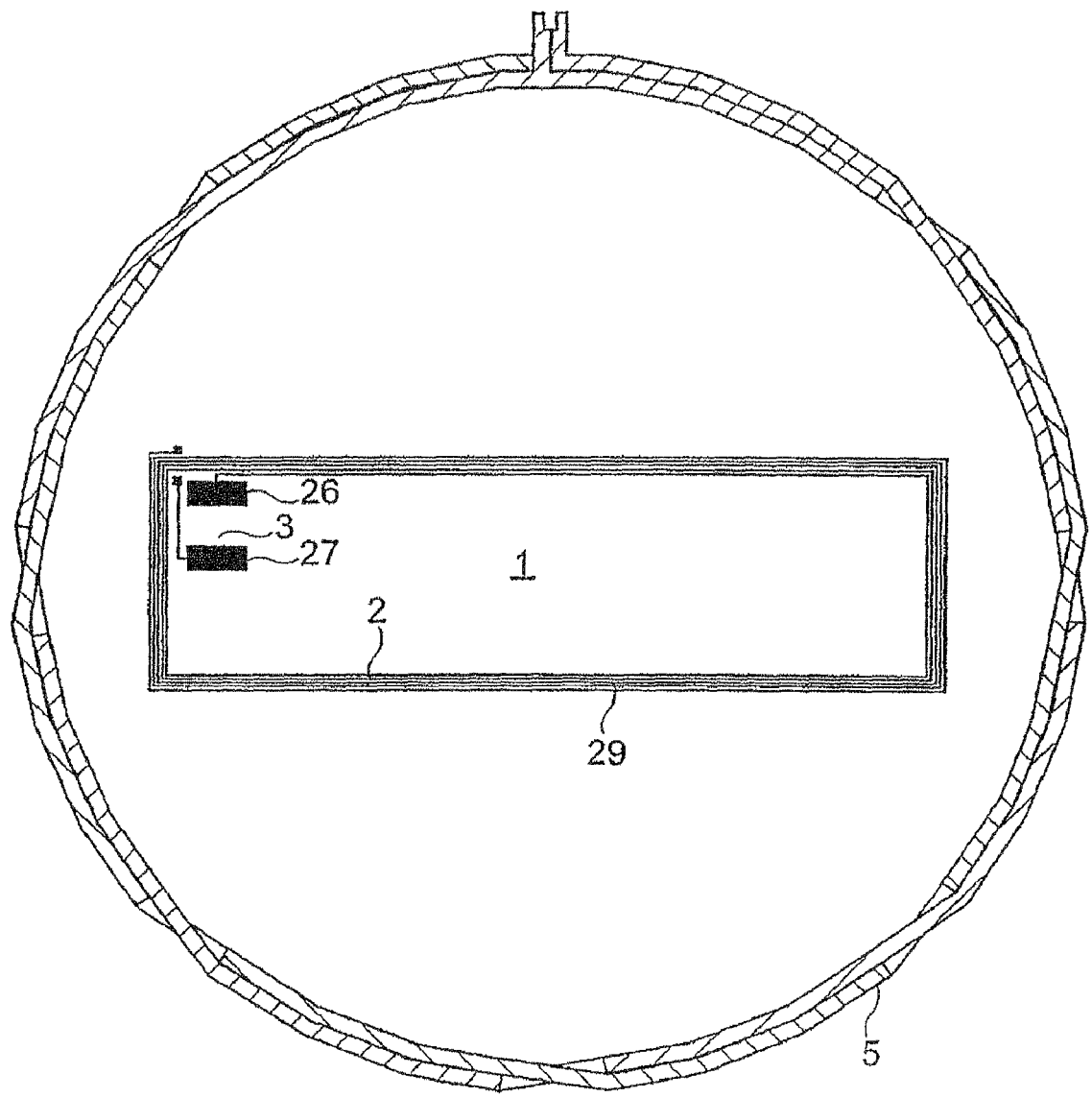
FIG. 6 is a diagram representing the contactless electronic device from FIG. 3 disposed near the antenna of a prior art reader.

Referring to FIG. 6, there is represented the antenna of a reader 5 (antenna station) the parameters whereof (dimensions of the antenna or the reader) conform to the ISO 10373 standard.

Figure 7:
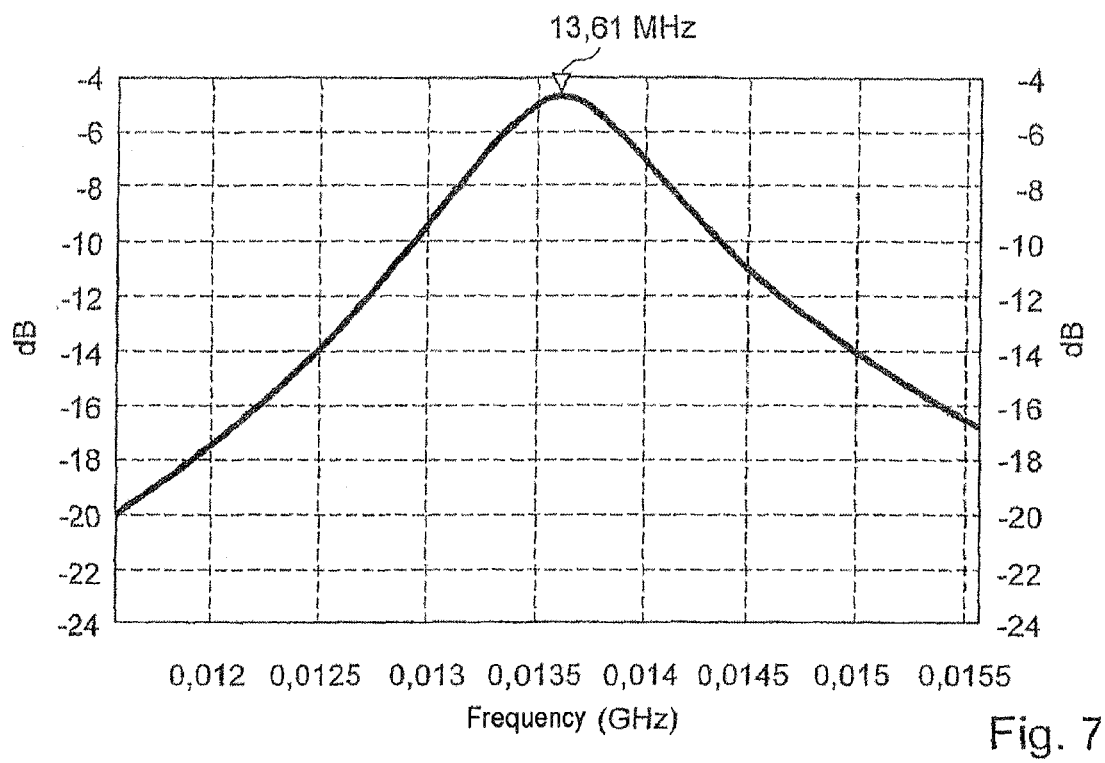
FIGS. 7, 8 and 9 represent the coupling of the elements of a FIG. 6 installation when the reader is situated at a distance respectively corresponding to 0.5 ISO, 1 ISO and 2 ISO, as in the prior art.
Figure 8:
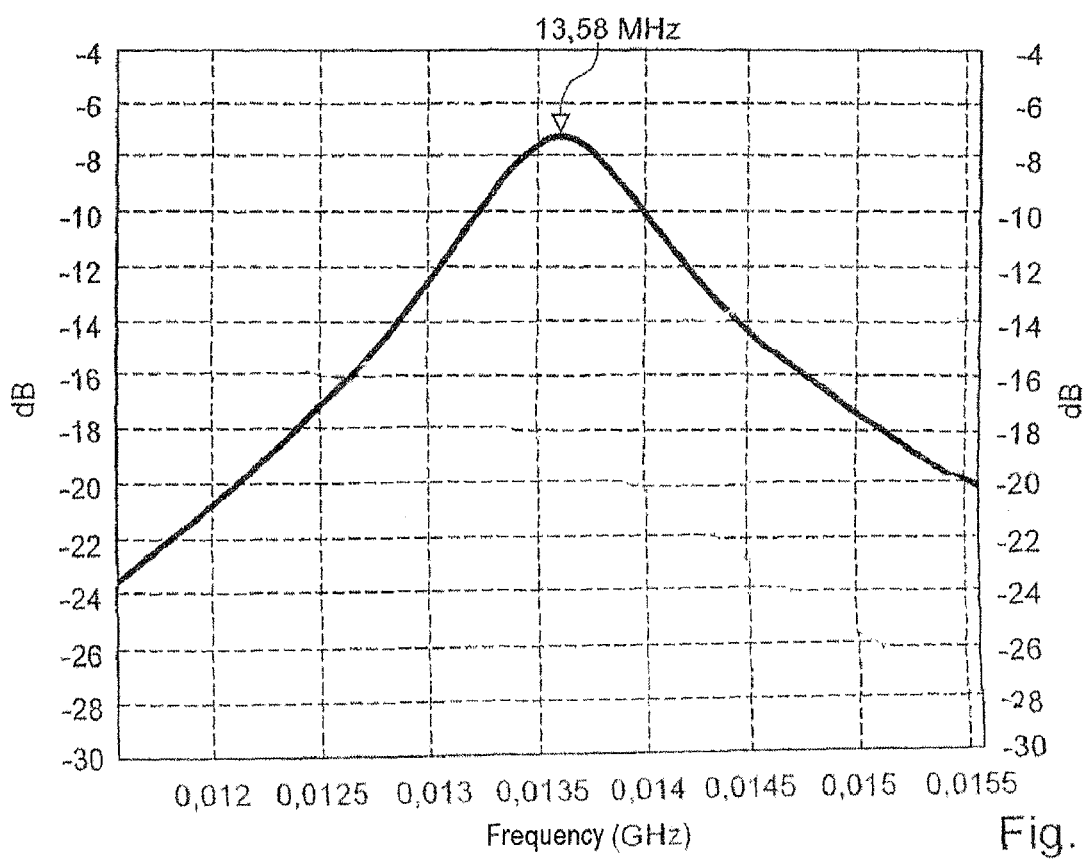
Figure 9:
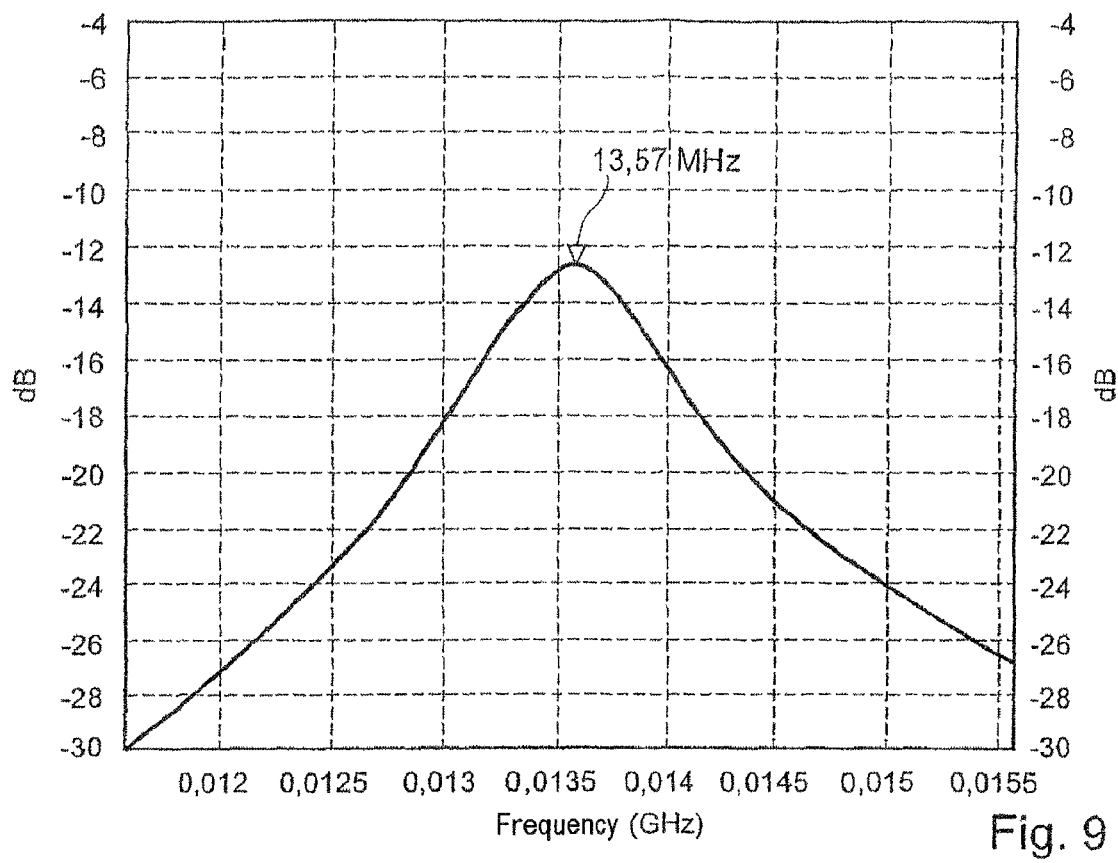

Referring to FIGS. 7, 8 and 9, there is represented the coupling between the antenna of the reader 5 loaded by a resistance of 50 ohms and the antenna 2 loaded by the microcircuit 3, respectively at distances of 0.5 ISO (18.75 mm), 1 ISO (37.5 mm) and 2 ISO (75 mm).

Note that the frequency at maximum coupling does not vary much if at all.

It should be noted that the microcircuit 3 is designed to operate over a clearly defined range of frequencies. Outside that range, the microcircuit 3 does not operate at all, regardless of the power of the received signal. This range is typically centered on 13.56 MHz and substantially extends over less than 1 MHz.

Referring to FIG. 10, there is represented a first embodiment of the resonator 7 according to the invention.

The resonator 7 is a winding with 28 turns forming a 120×80 mm rectangle. The turns have a width of 0.3 mm spaced two by two at 0.3 mm. Here the ends 13 and 15 of the winding are free.

Figure 11:
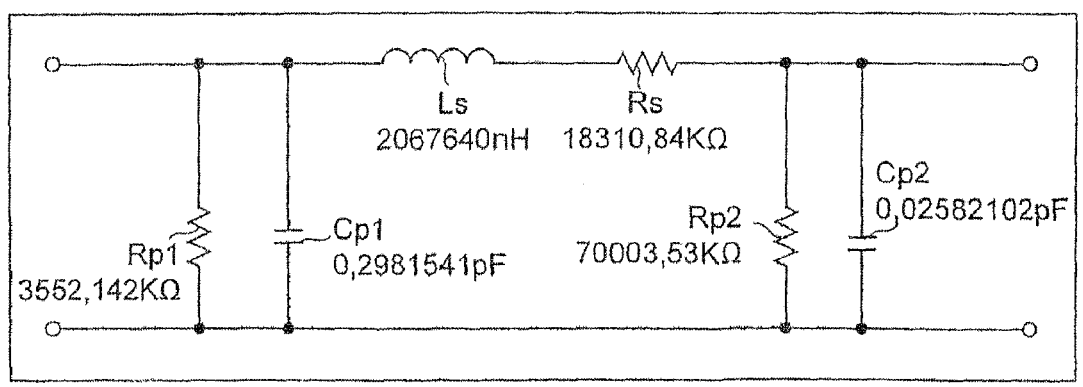
FIG. 11 shows the equivalent circuit diagram of the folding document with the resonator from FIG. 10 in accordance with the invention.

Referring to FIG. 11, there is represented the pi equivalent electronic model of the resonator in which the resonator is represented by an inductor Ls (inductance 2067640 nH for example) and a resistor Rs in series (resistance 18310.84Ω for example).

Two capacitors $C_p1$ (capacitance 0.2981541 pF) and $C_p2$ (capacitance 0.02582102 pF) and two resistors $R_p1$ (resistance 3552.142 kΩ) and $R_p2$ (resistance 70003.53 kΩ) connected in parallel model the behavior of the resonator as a function of frequency. For example, the resonant frequency $F_{res}$ of the resonator alone is 8.0745 MHz.

Figure 12:
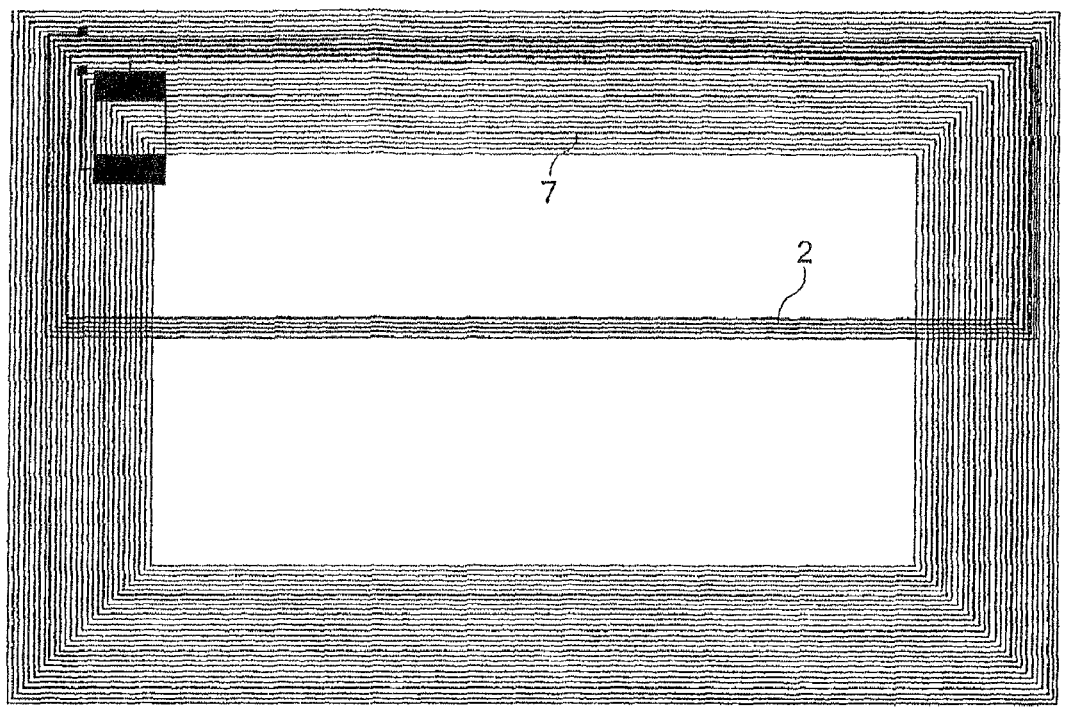
FIG. 12 is a diagram representing the contactless electronic device from FIG. 3 in the vicinity of the resonator from FIG. 10 according to the invention.

Referring to FIG. 12, there are represented the shape and the disposition of the resonator from FIG. 11 juxtaposed with the antenna 2 from FIG. 3. This representation corresponds to the configuration in which the portions 12 and 14 of the support 10 from FIG. 2 are substantially superposed one on the other with the antenna 2 disposed in line with the resonator.

Figure 13:
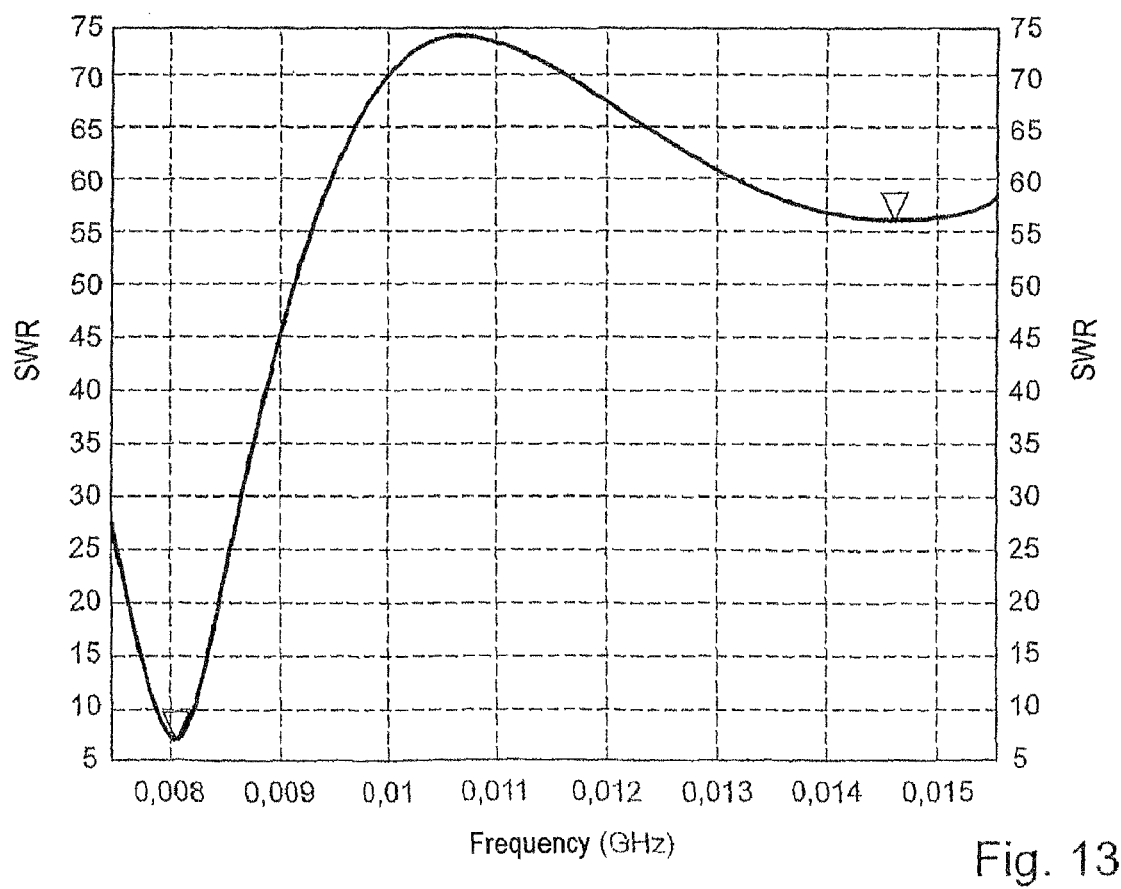
FIG. 13 illustrates the SWR of the FIG. 12 installation according to the invention.

Referring to FIG. 13, there is represented the SWR between the antenna of the equipment with resonator described with reference to FIG. 12 on the one hand and the microcircuit 3 on the other hand.

There is seen a real disturbance of the SWR of the antenna 2 (with the microcircuit 3) at the frequency close to that of the resonator 7. It is seen that the microcircuit 3 is favorably adapted to operate at the frequency of the resonator. The SWR around the operating frequency of the microcircuit 3 does not change significantly. The effect on the coupling between the reader 5 and the antenna 2 is the opposite effect.

It is particularly beneficial to choose a resonator the resonant frequency whereof is between 6 and 10 MHz and preferably between 7.5 and 8.5 MHz for a microcircuit operating at (around) 13.56 MHz.

The resonator can instead have different frequencies, in particular higher than the operating frequency of the microcircuit.

Figure 14:
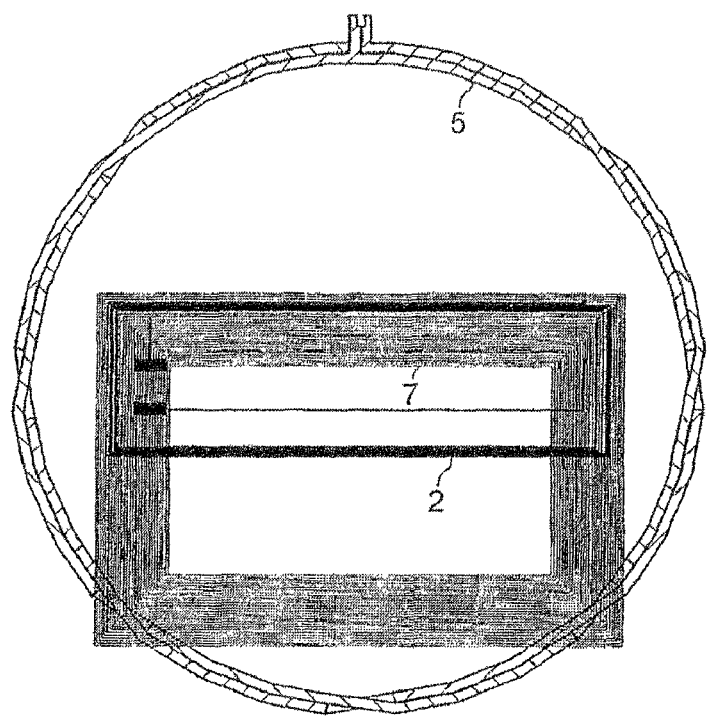
FIG. 14 is a diagram representing the installation from FIG. 12 disposed in the vicinity of the antenna of a reader according to the ISO 10773 standard at a distance corresponding to 1 ISO.

Referring to FIG. 14, there is represented the equipment described with reference to FIG. 12 disposed in the vicinity of the antenna of a reader 5 (distance corresponding to 1 ISO, for example, i.e. 37.5 mm).

Figure 15:
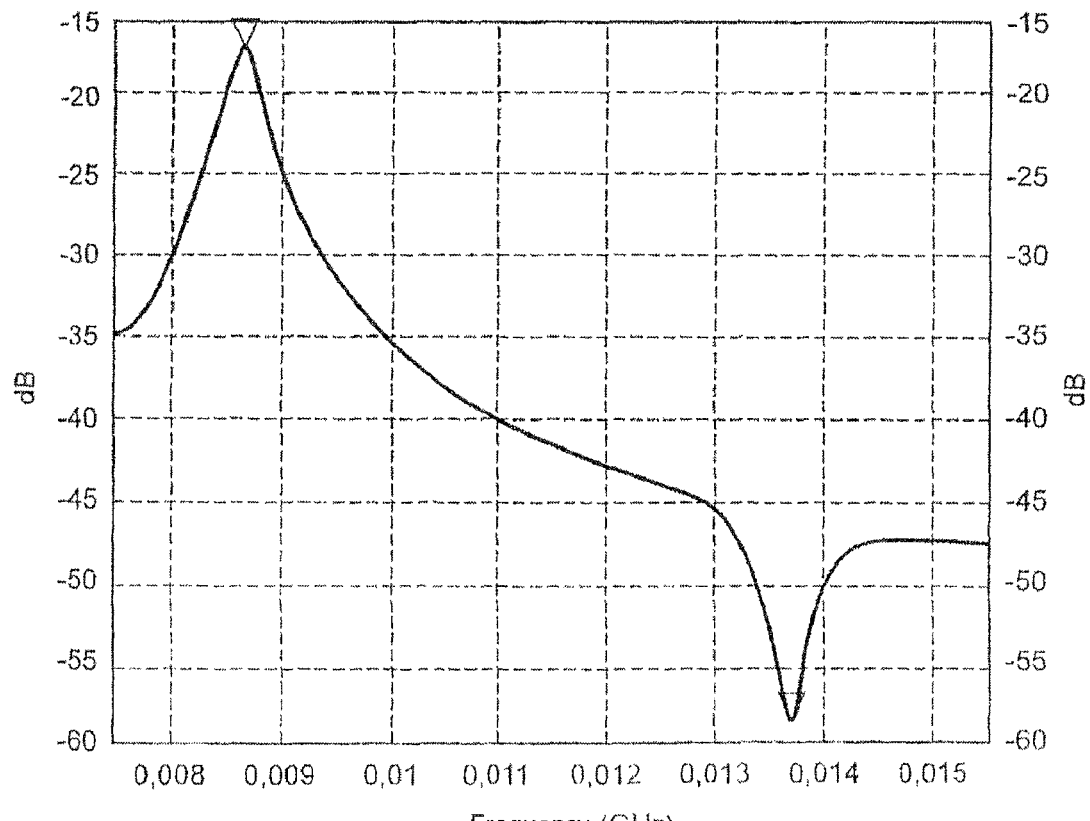
FIG. 15 shows the wideband coupling of the installation according to the invention from FIG. 14 at a distance of 1 ISO from the antenna of a reader.

Referring to FIG. 15, there is shown the coupling between the reader 5 and the antenna 2 of the equipment with resonator, the reader 5 being disposed at a distance corresponding to 1 ISO. Note a maximum coupling of −17.70 dB at 8.64 MHz and a minimum coupling of −58.39 dB at 13.73 MHz.

In other words, maximum coupling is observed at the resonant frequency of the resonator and minimal coupling at the operating frequency of the microcircuit. Thus a resonator of this kind, in particular because of its resonant frequency and its frequency behavior, generates strong attenuation of the signal sent to the electronic microcircuit, precisely at the frequency of said electronic microcircuit.

Figure 18:
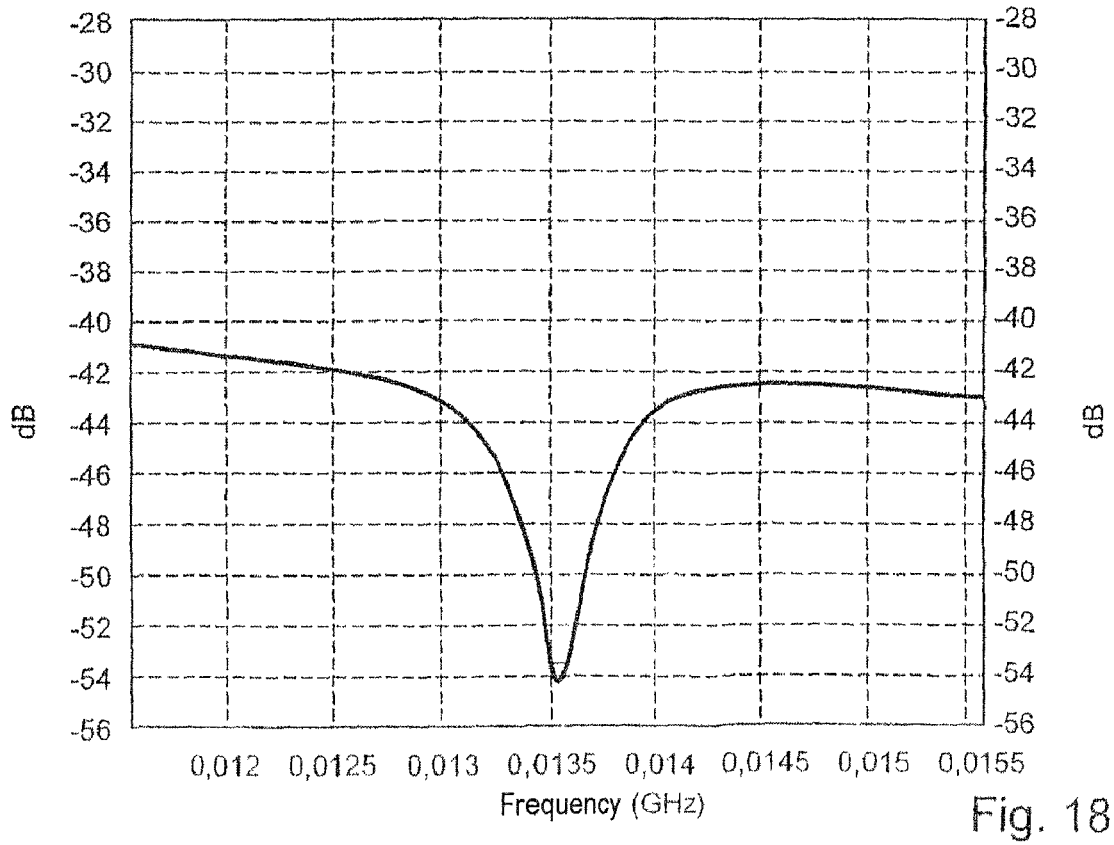
FIGS. 16, 17 and 18 are diagrams representing the coupling according to the invention of the installation from FIG. 14 placed in the vicinity of the antenna of a reader at respective distances of 0.5 ISO, 1 ISO, and 2 ISO.
Figure 16:
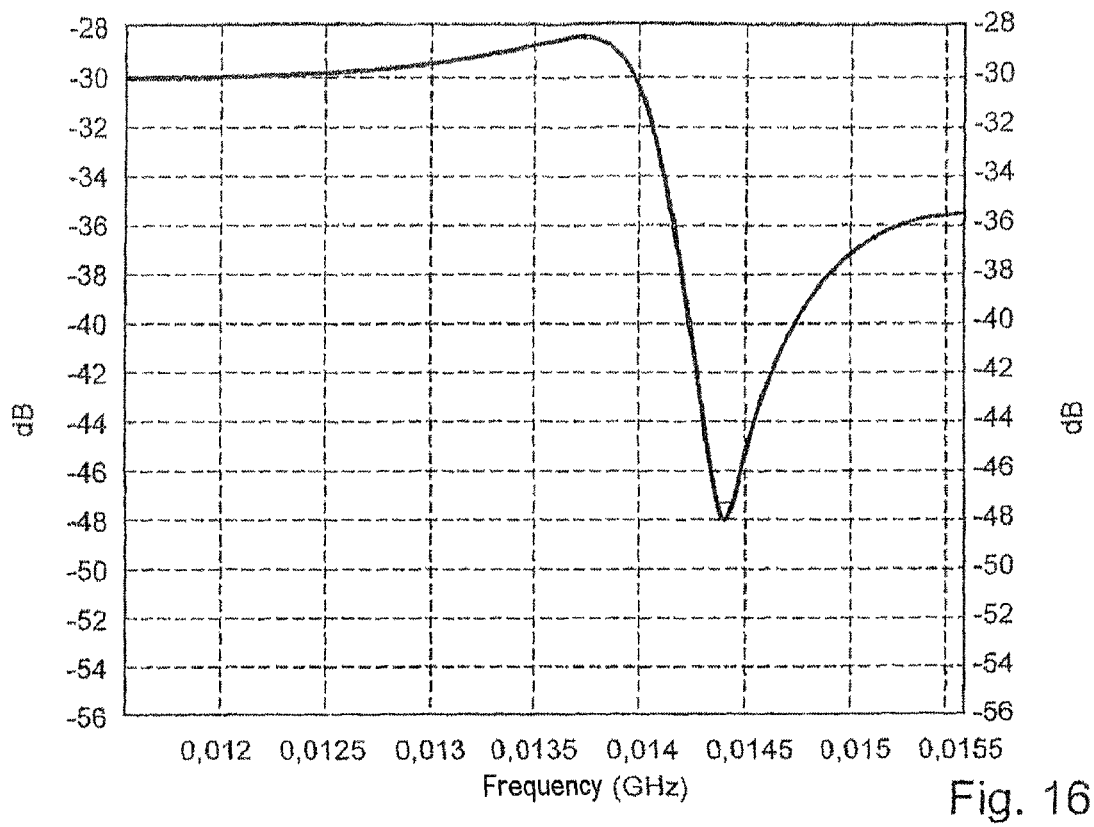
Figure 17:
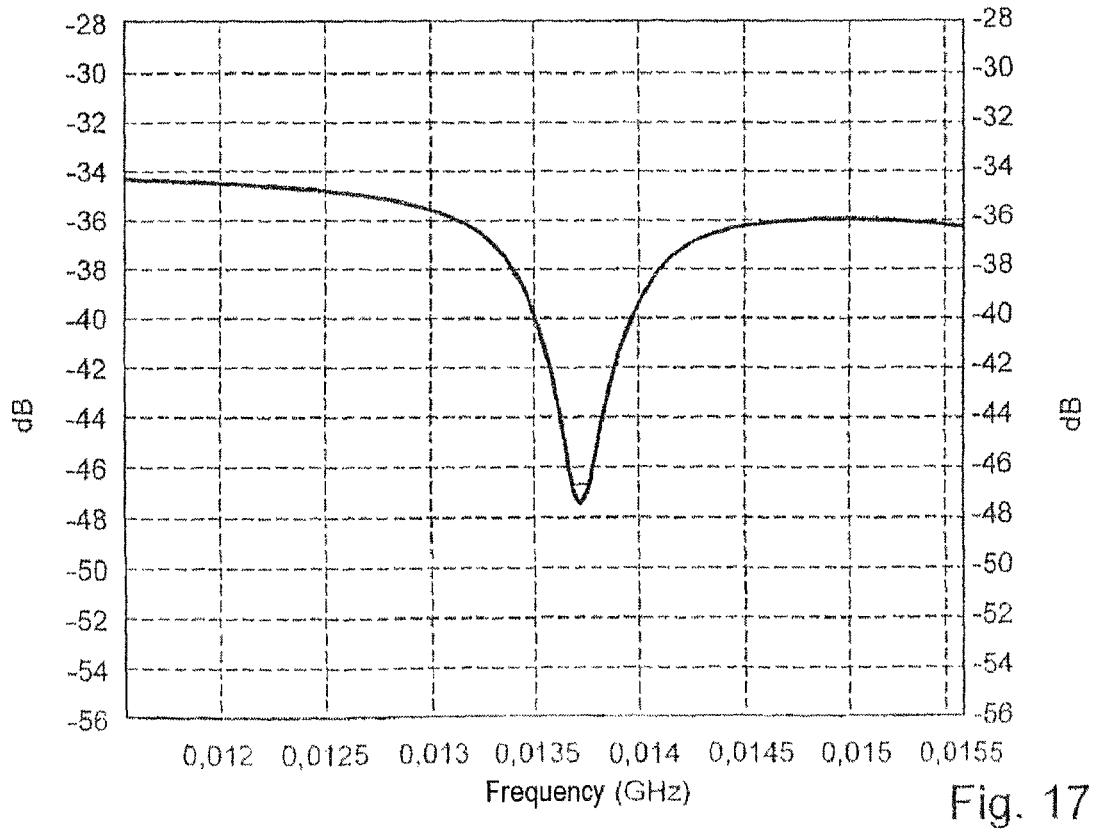

Referring to FIGS. 16, 17 and 18, there is represented the coupling between the reader 5 and the antenna 2 at respective distances from the reader corresponding to 0.5 ISO, 1 ISO and 2 ISO.

Note a minimum coupling of −14.10 dB at 14.39 MHz for 0.5 ISO, a minimum coupling of −47.50 dB at 13.73 MHz for 1 ISO, and a minimum coupling of −54.31 dB at 13.56 MHz for 2 ISO.

Referring to FIG. 19, there is represented a second embodiment of the resonator 7 according to the invention. Here the resonator 7 comprises three turns 0.3 mm wide spaced from each other by 0.3 mm. The shape of the winding is again rectangular with dimensions of 120×80 mm.

Figure 20:
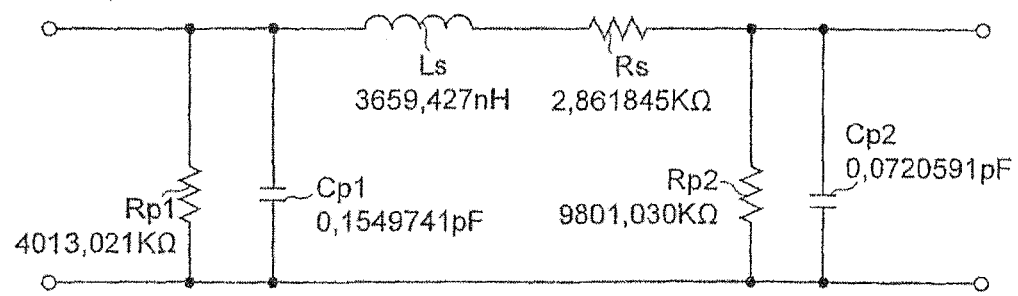
FIG. 20 is an equivalent circuit diagram of a contactless electronic device from FIG. 3 equipped with the resonator from FIG. 19.

Referring to FIG. 20, there is represented the equivalent electrical model of the resonator from FIG. 19 with the (corresponding) values of the elements. The resonator 7 can be in whole or in part a discrete component. For example, a 70.1 pF capacitor can be connected between the terminals 9 and 11 of the resonator (top left of the FIG. 19 resonator).

Referring to FIG. 20, the resonator with no load has a resonant frequency equal to 42.642 MHz and a frequency equal to 9.931 MHz when it is loaded by a 70.1 pF capacitor (not shown).

Figure 21:
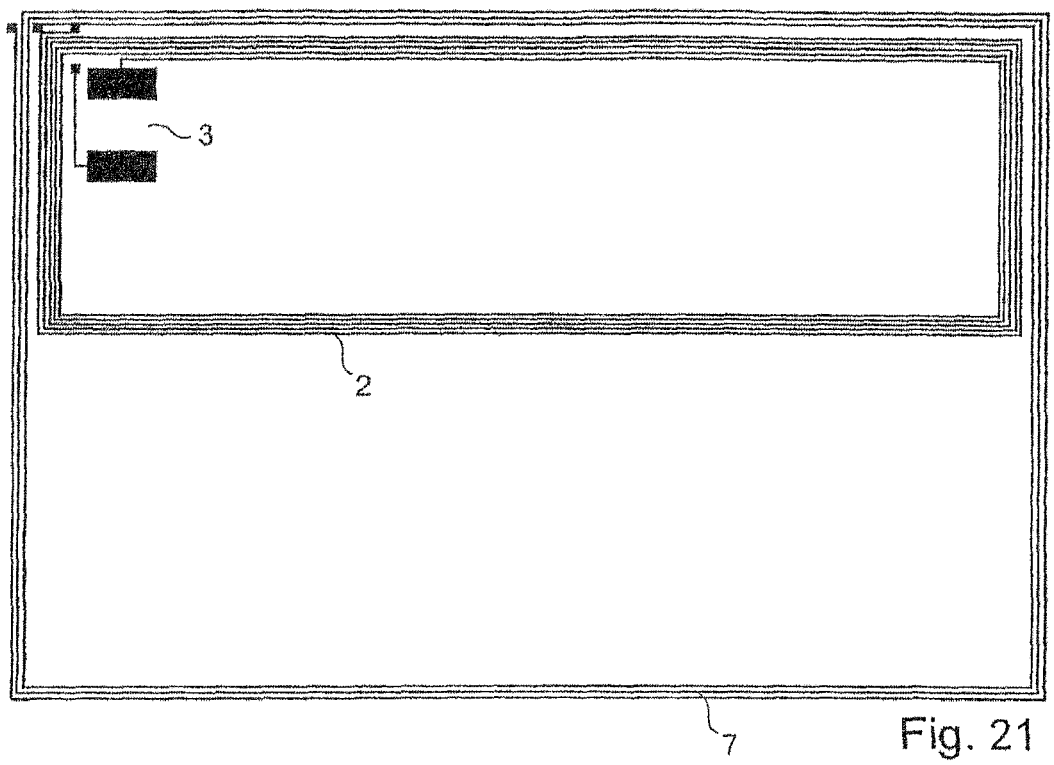
FIG. 21 is a diagram representing an installation equipped with an electronic device from FIG. 3 including a resonator from FIG. 19.

Referring to FIG. 21, there are represented the shape and the disposition of the resonator from FIG. 19 relative to the antenna 2 and the microcircuit 3 when the support 10 is closed.

Figure 22:
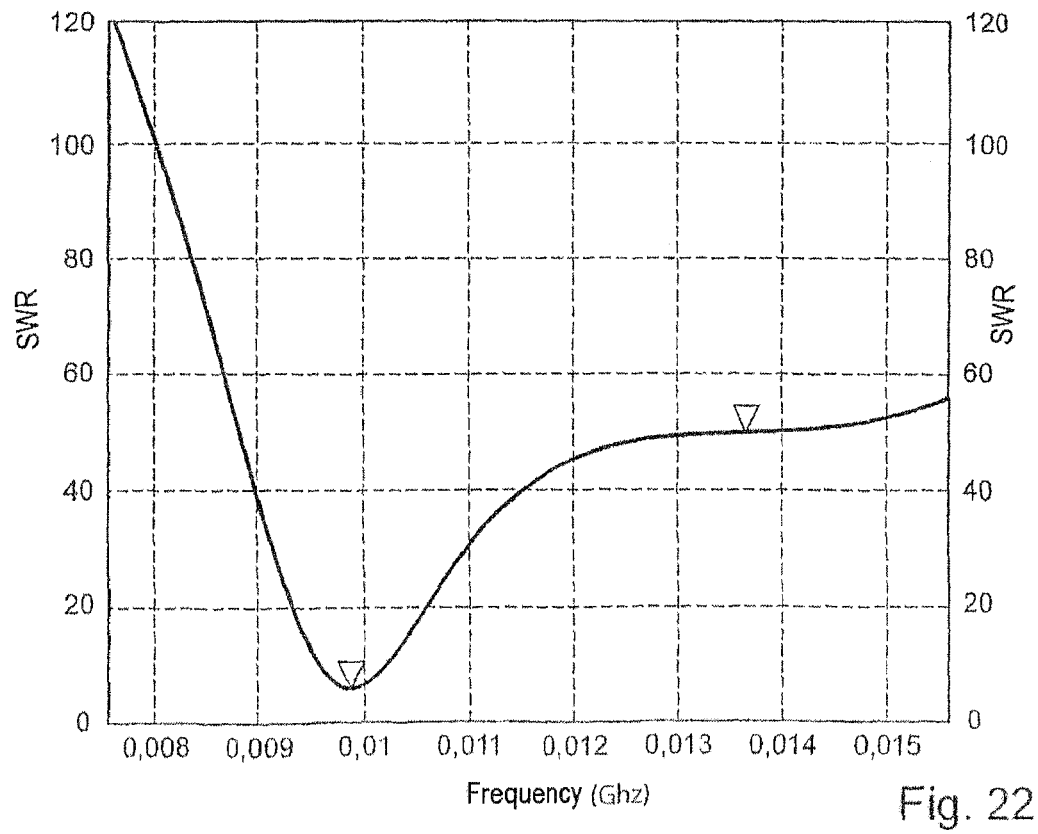

Referring to FIG. 22, there is represented the SWR between the antenna 2 on the one hand and the microcircuit 3 on the other hand when the resonator 7 is loaded by a capacitor as described with reference to FIG. 19.

An SWR of 6.43 is observed at the frequency of 9.88 MHz and an SWR of 49.65 at the frequency of 13.60 MHz.

Figure 23:
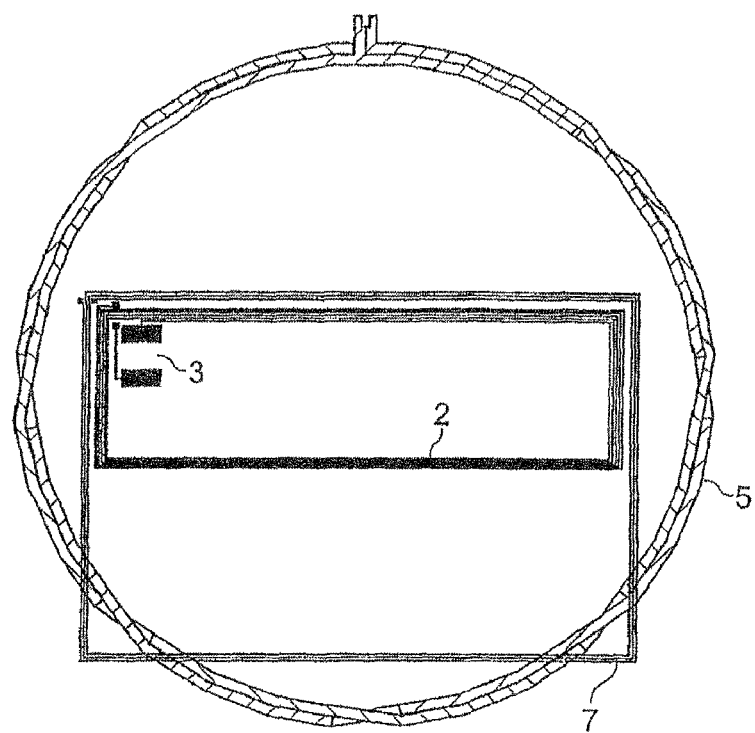

Referring to FIG. 23, there is represented the antenna of a reader 5 conforming to the ISO 10773 standard disposed in the vicinity of the electronic equipment described with reference to FIG. 21.

Figure 24:
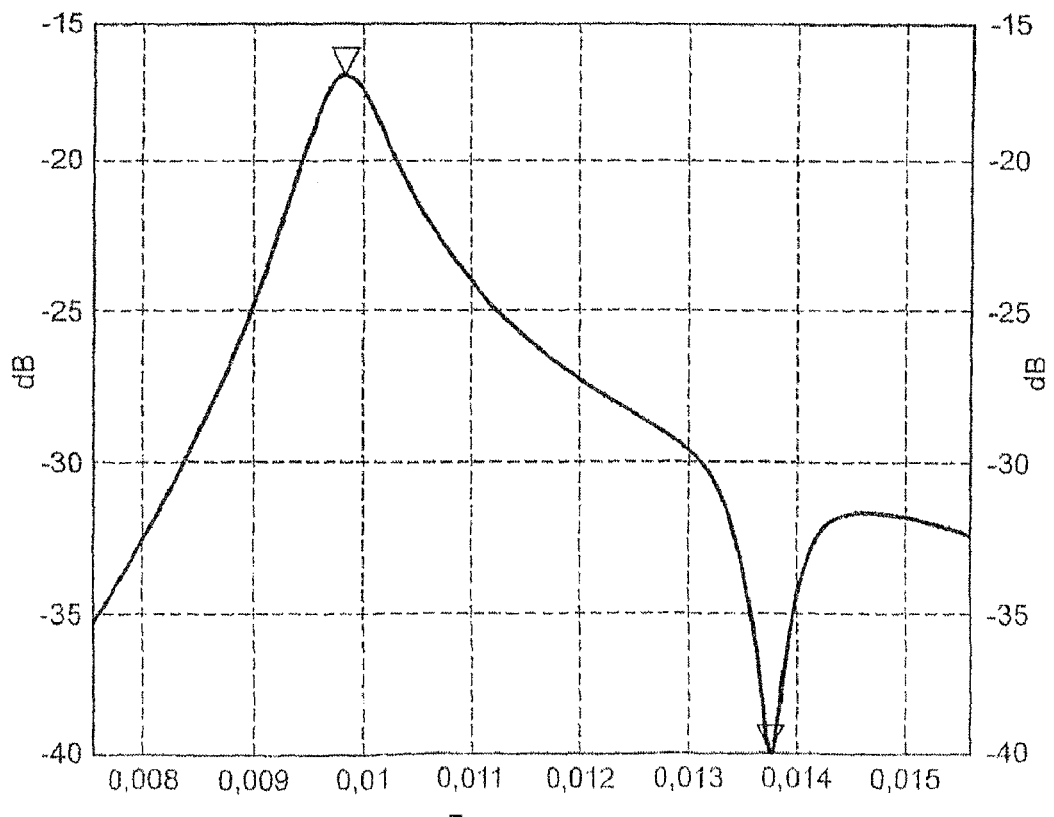

Referring to FIG. 24, there is represented the coupling in a wide frequency band when the reader 5 is situated at a distance equal to 1 ISO from the equipment from FIG. 21.

A maximum coupling of −16.89 dB is observed at the frequency of 9.82 MHz and a minimum coupling of −40.08 dB at 13.74 MHz.

Figure 25:
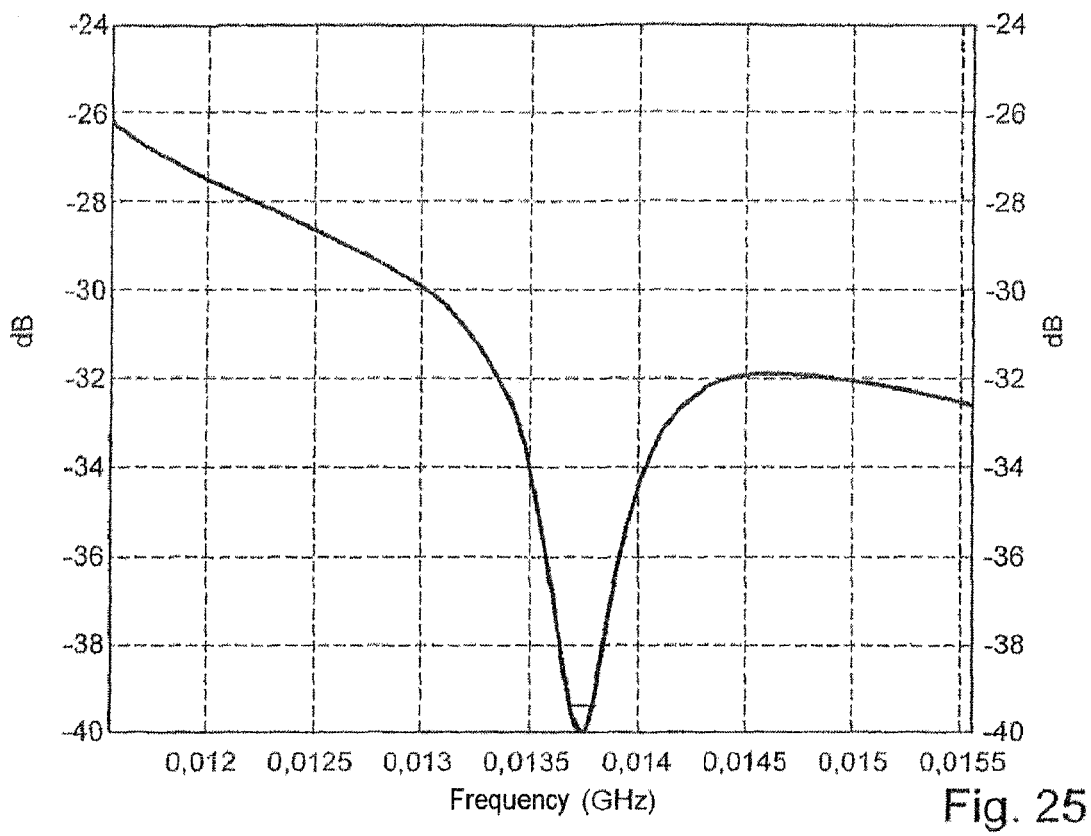

Referring to FIG. 25, there is represented the coupling in a frequency band situated around the operating frequency of the microcircuit when the reader 5 is placed at a distance equal to 1 ISO from the equipment from FIG. 21. A minimum coupling of −39.99 dB is observed at 13.76 MHz.

Figure 26:
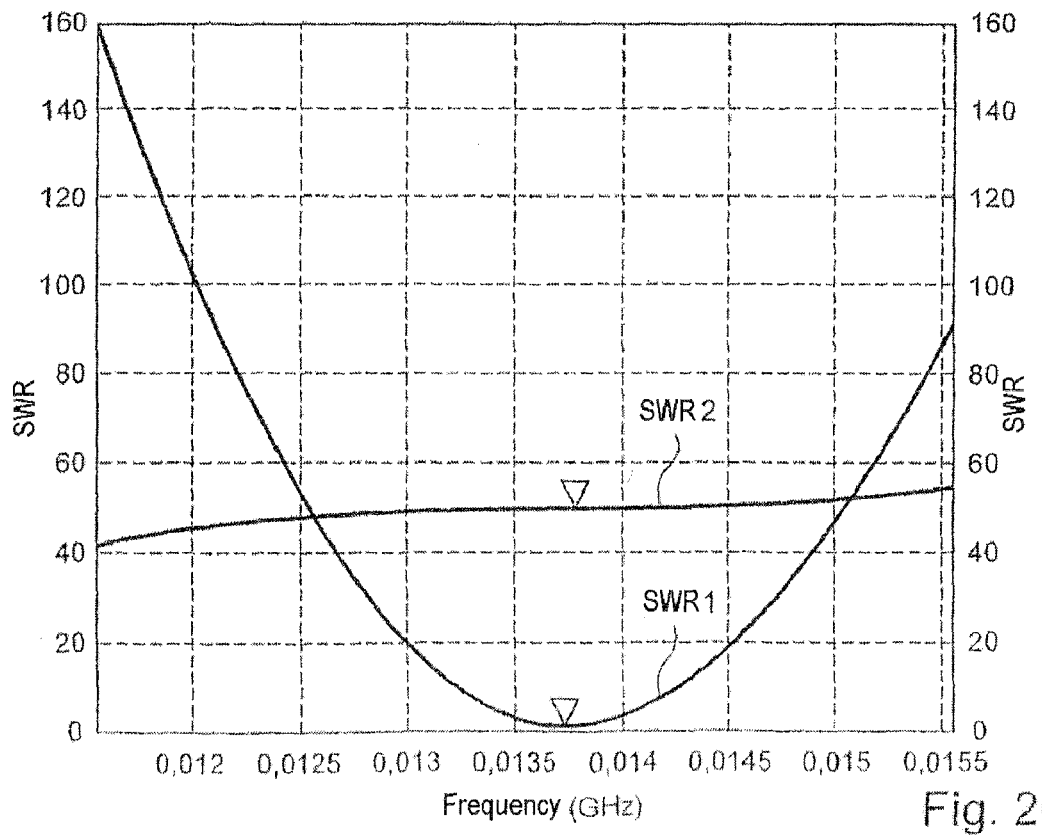

Referring to FIG. 26, there are represented a SWR1 for the reader 5 and an SWR2 for the contactless electronic device from FIG. 21. An SWR1 of 1.1 is observed at 13.77 MHz and an SWR2 of 49.77 at 13.78 MHz.

Figure 27:
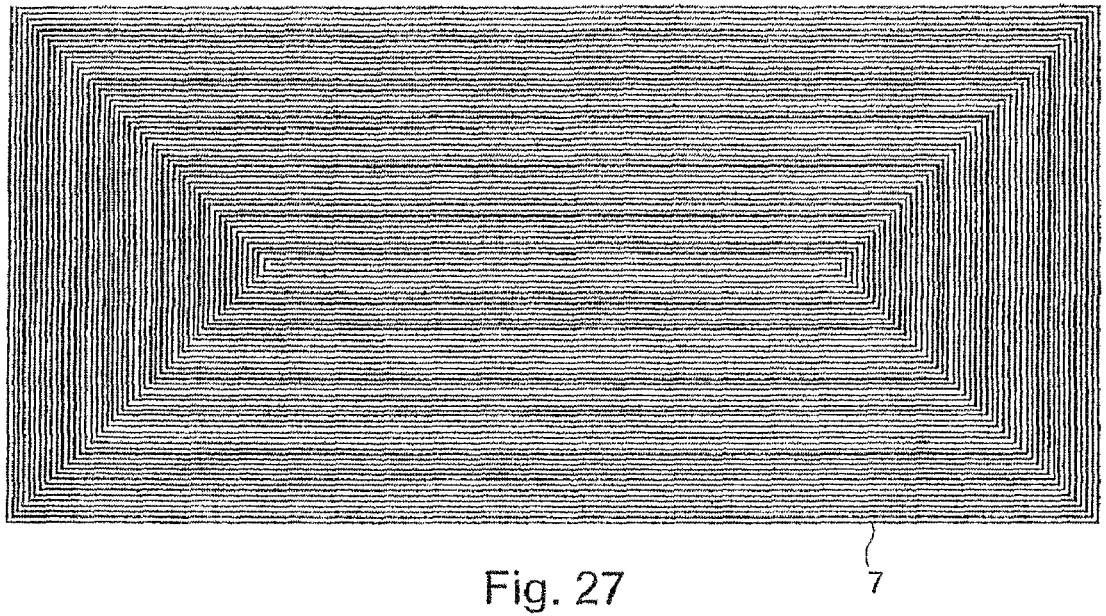

Referring to FIG. 27, there is represented a third embodiment of the resonator 7 according to the invention. It consists of 48 turns 0.3 mm wide spaced from each other by 0.3 mm. It is of rectangular shape with dimensions of 120×27.3 mm.

Figure 28:
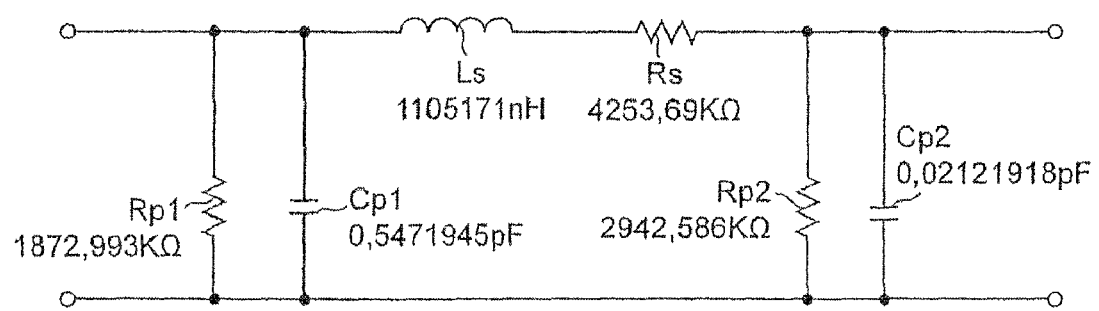

Referring to FIG. 28, there is represented the equivalent model of the resonator from FIG. 27. The resonant frequency with no load is equal to 8.3199 MHz here.

Figure 29:
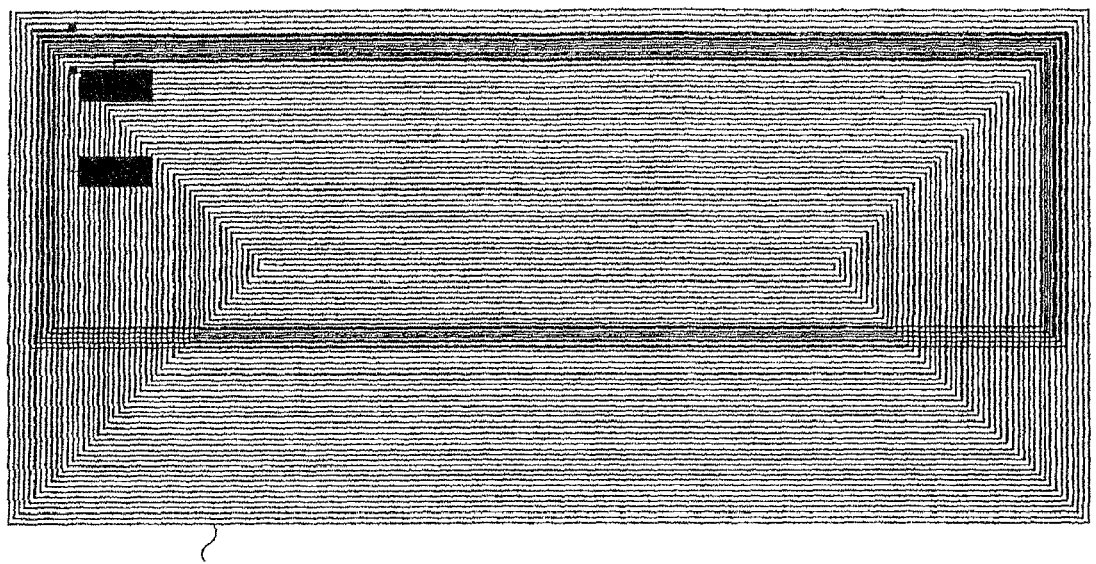

Referring to FIG. 29, there are represented the shape and the disposition of the resonator from FIG. 27 when coupled to the antenna 2 and the microcircuit 3 of the contactless electronic device of the invention (here with the support closed).

Figure 30:
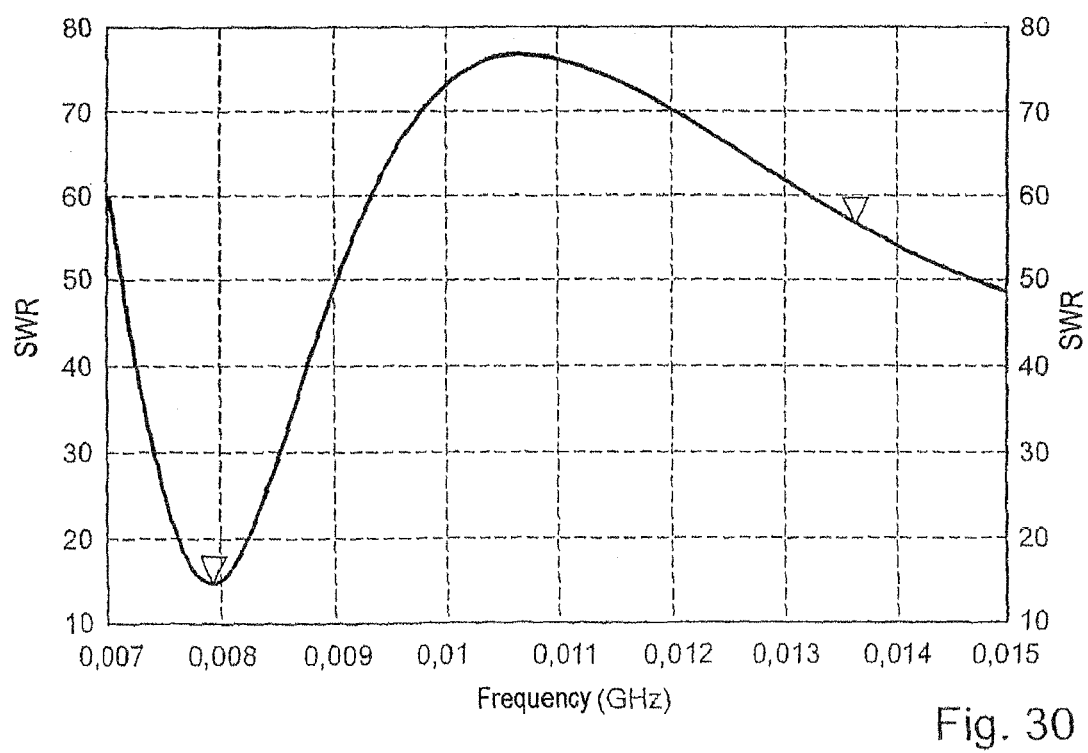

Referring to FIG. 30, there is represented the SWR between the antenna 2 and the microcircuit 3 of the contactless electronic device equipped with the resonator 7 from FIG. 27. An SWR of 14.67 is observed at the frequency of the resonator (7.96 MHz) and an SWR of 56.75 at the frequency of the microcircuit (13.64 MHz).

Figure 31:
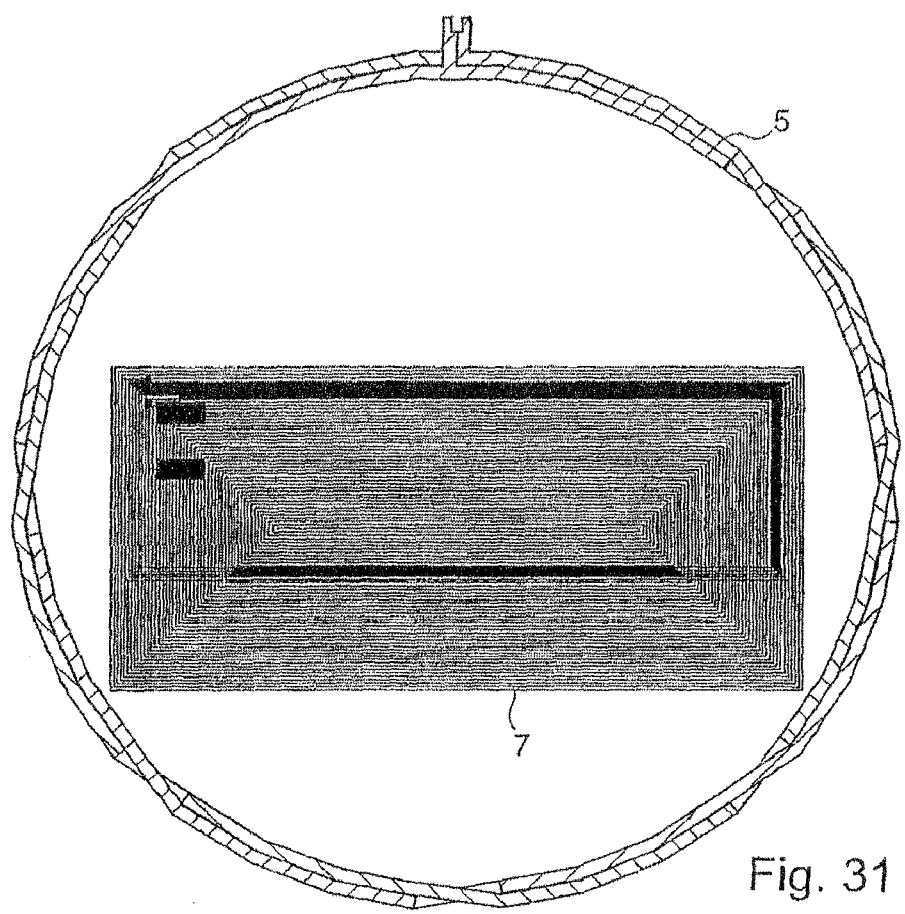

Referring to FIG. 31, there is represented the equipment comprising the antenna 2, the microcircuit 3 and the resonator 7 from FIG. 27 disposed in the vicinity of the antenna of a reader 5 conforming to the ISO 10773 standard.

Figure 32:
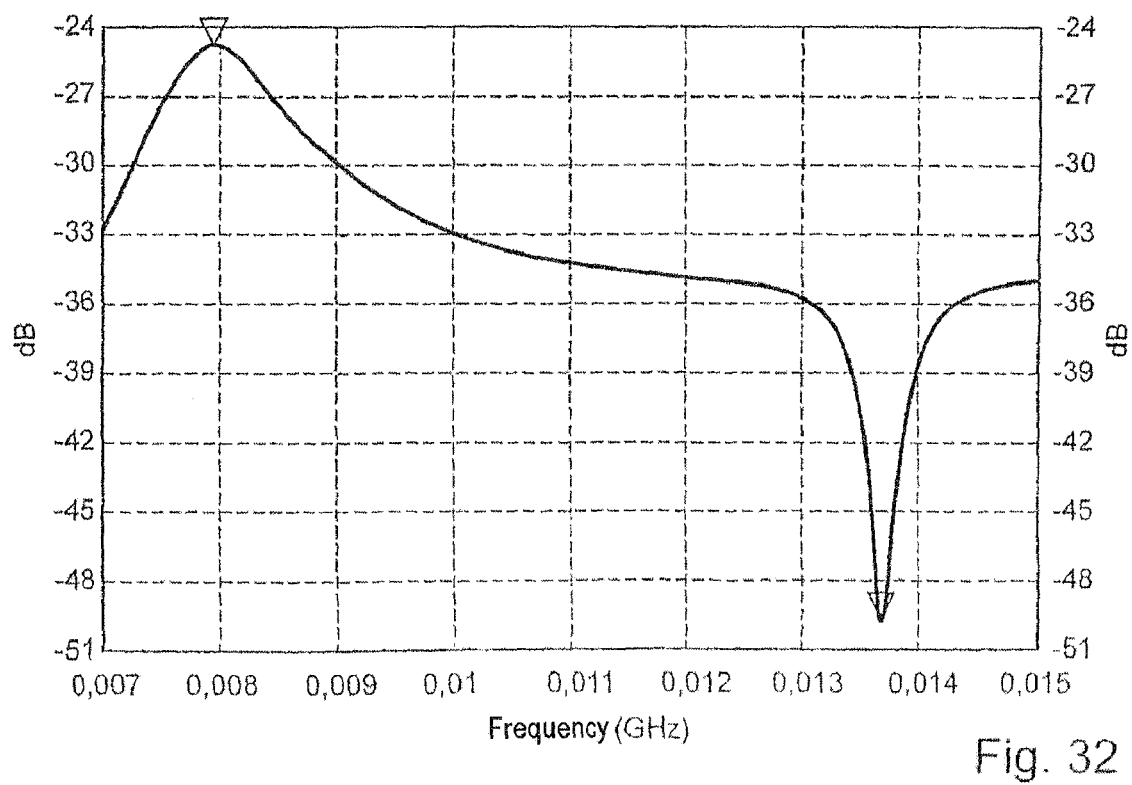

Referring to FIG. 32, there is represented a broadband coupling at the distance 1 ISO from the equipment from FIG. 31. A maximum coupling equal to 24.75 dB is observed for a frequency equal to 7.96 MHz and a minimum coupling equal to 49.76 dB for a frequency equal to 13.64 MHz.

Referring to FIGS. 33 and 34, there are represented measurements that show the relative efficacy of the various resonators described hereinabove. A high loss (attenuation) is observed in particular for the resonators described with reference to FIGS. 10 to 18 and FIGS. 27 to 32. The frequency drift is caused by the mutual inductance between the reader 5, the antenna 2, the microcircuit 3 and the resonator 7.

Note that the resonator according to the invention has an attenuating power greater than the stray attenuation of attenuators with no resonance phenomenon.

For example, non-operation of the microcircuit (countermeasure) is obtained up to an opening angle of 45° for a resonator as described with reference to FIGS. 10 to 18.

Such non-operation (countermeasure) can be obtained for an angular offset between the portions 12 and 14 of the support 10 up to 60° (FIG. 2).

The invention claimed is:

1. A document comprising:
a support (10) having at least a first portion (12) and a second portion (14) configured to be moved relative to each other; and
a contactless electronic device (1) mounted in the first portion (12) of the support (10) and including an electronic microcircuit (3) and an antenna (2) electrically connected to said electronic microcircuit (3) and configured to be (electro)magnetically coupled to an external reading station (5),
wherein the electronic microcircuit (3) being configured to exchange information with an external environment, and
the second portion (14) comprises means (7) for attenuating the (electro)magnetic coupling, including a resonator circuit coupled to said antenna and disposed substantially in line with the antenna upon the first portion (12) and the second portion (14) being substantially superposed one on the other, and configured to render inoperative or operative the exchange of information with the external environment as a function of an offset between the first and second portions (12 and 14), and a resonant frequency of the resonator circuit (7) is outside a range of operating frequencies of the electronic microcircuit.

2. The document according to claim 1, wherein the first portion (12) and the second portion (14) of the support (10) are independent and not connected to each other.

3. The document according to claim 1, wherein the document can be folded and the first and second portions (12 and 14) are adapted to pivot relative to each other about a fold line (16) along edges (18 and 20) of these portions (12 and 14).

4. The document according to claim 3, wherein virtually all of the antenna (2) extends over approximately half an area of the first portion (12) situated in a vicinity of the fold line.

5. The document according to claim 4, wherein the antenna (2) extends over virtually all of the edge (18) of the first portion along the fold line (16).

6. The document according to claim 3, wherein the resonator circuit (7) extends over substantially more than half an area of the second portion (14) situated in a vicinity of the fold line (16).

7. The document according to claim 6, wherein the resonator circuit (7) extends over virtually all of the edge (20) of the second portion along the fold line (16).

8. The document according to claim 3, wherein the antenna (2) is of rectangular shape, with a longer side along the fold line.

9. The document according to claim 3, wherein a geometrical center of the antenna (2) is placed in a first quarter of the first portion (12) situated relatively close to the fold line (16).

10. The document according to claim 3, wherein a right-hand edge of the antenna (2) is situated at a distance (d) from the fold line (16) between 2 and 15 mm.

11. The document according to claim 10, wherein said distance (d) is approximately 5 mm.

12. The document according to claim 1, wherein the electronic microcircuit (3) operates at a frequency below 100 MHz.

13. The document according to claim 12, wherein the operating frequency of the electronic microcircuit (3) is between 13 and 15 MHz.

14. The document according to claim 13, wherein the operating frequency of the electronic microcircuit (3) is approximately 13.56 MHz and has a bandwidth of an order of 1 MHz.

15. The document according to claim 13, wherein the resonant frequency of the resonator circuit (7) is between 6 and 10 MHz.

16. The document according to claim 15, wherein the resonant frequency of the resonator circuit (7) is between 7.5 MHz and 8.5 MHz.

17. The document according to claim 1, wherein the resonator circuit (7) comprises a conductive winding.

18. The document according to claim 17, wherein the conductive winding has free ends (13 and 15).

19. The document according to claim 1, wherein the resonator circuit (7) comprises a plurality of turns.

20. The document according to claim 19, wherein the document is of small size and the resonator (7) comprises more than 20 turns.

21. The document according to claim 19, wherein the turns are separated two by two by a distance less than 0.5 mm.

22. The document according to claim 1, wherein the antenna (2) comprises a conductive winding connected to the electronic microcircuit.

23. The document according to claim 1, wherein the exchange of information with the external environment is rendered inoperative by the attenuation means for an angular offset between 0° and 60°.

24. The document according to claim 23, wherein the exchange of information with the external environment is rendered inoperative by the attenuation means for an angular offset between 0° and 45°.

25. The document according to claim 1, wherein the antenna (2) and the resonator (7) are produced during a same production step.

26. The document according to claim 1, wherein the document belongs to a group formed of security documents, identity documents, passports, driver's permits.

27. The document according to claim 1, wherein the resonator circuit is disposed substantially in line with the antenna in order to attenuate said coupling when the first portion and the second portion are substantially superposed one on the other.

28. The document according to claim 1, wherein the resonator circuit has a resonant frequency outside a range of operating frequencies of the microcircuit, thus attenuating said coupling when the first portion and the second portion are substantially superposed one on the other.

29. An electronic entity comprising:
- a support having at least first and second portions configured to be moved relative to each other with respect to a chosen displacement axis; and
- a contactless electronic device mounted in the first portion of the support and including an electronic microcircuit and an antenna electrically connected to that electronic microcircuit and adapted to be (electro)magnetically coupled to an external reading station, the electronic microcircuit being adapted to exchange information with an external environment,
- wherein the second portion has means for attenuating the electromagnetic coupling comprising a resonator circuit coupled to said antenna and disposed substantially in line with the antenna when the first and second portions are substantially superposed one on the other, and adapted to render the exchange of information with the external environment inoperative as a function of an offset between the first and second portions, and
- a resonant frequency of the resonator circuit (7) is outside a range of operating frequencies of the electronic microcircuit.

30. A method of controlling exchange of information between a document and an external reading station, said document including a support (10) having at least a first portion (12) and a second portion (14) configured to be moved relative to each other with respect to a chosen displacement axis (16) and a contactless electronic device (1) mounted in the first portion (12) of the support and including an electronic microcircuit (3) and an antenna (2) electrically connected to that electronic microcircuit (3) and configured to be (electro) magnetically coupled to an external reading station (5), the electronic microcircuit (3) being configured to exchange information with an external environment, and
- the second portion (14) includes means for attenuating the electromagnetic coupling comprising a resonator circuit (7) coupled to said antenna (2) and disposed substantially in line with the antenna (2) when the first portion (12) and the second portion (14) are substantially superposed one on the other and in that the attenuation means (7) render the exchange of information with the external environment inoperative as a function of an offset between the first and second portions (12 and 14), and
- a resonant frequency of the resonator circuit (7) is outside a range of operating frequencies of the electronic microcircuit.

* * * * *